United States Patent
Okada

(10) Patent No.: US 11,678,081 B2
(45) Date of Patent: Jun. 13, 2023

(54) IMAGING DEVICE AND IMAGE PROCESSING METHOD

(71) Applicant: Panasonic Intellectual Property Management Co., Ltd., Osaka (JP)

(72) Inventor: Yusuke Okada, Osaka (JP)

(73) Assignee: PANASONIC INTELLECTUAL PROPERTY MANAGEVENT CO., LTD., Osaka (JP)

(*) Notice: Subject to any disclaimer, the term of this patent is extended or adjusted under 35 U.S.C. 154(b) by 0 days.

(21) Appl. No.: 17/813,342

(22) Filed: Jul. 19, 2022

(65) Prior Publication Data
US 2022/0368842 A1 Nov. 17, 2022

Related U.S. Application Data

(63) Continuation of application No. PCT/JP2020/049224, filed on Dec. 28, 2020.

(30) Foreign Application Priority Data

Feb. 5, 2020 (JP) .............................. JP2020-018066

(51) Int. Cl.
*H04N 25/587* (2023.01)
*H04N 25/583* (2023.01)
(Continued)

(52) U.S. Cl.
CPC ......... *H04N 25/587* (2023.01); *H04N 25/583* (2023.01); *H04N 25/767* (2023.01)

(58) Field of Classification Search
CPC .. H04N 25/587; H04N 25/583; H04N 25/767; H04N 25/589; H04N 23/741;
(Continued)

(56) References Cited

U.S. PATENT DOCUMENTS

| 4,647,975 A | 3/1987 | Alston et al. |
| 2007/0171298 A1 | 7/2007 | Kurane |

(Continued)

FOREIGN PATENT DOCUMENTS

| JP | 62-108678 | 5/1987 |
| JP | 2007-194687 | 8/2007 |

(Continued)

OTHER PUBLICATIONS

International Search Report of PCT application No. PCT/JP2020/049224 dated Mar. 16, 2021.

*Primary Examiner* — Albert H Cutler
(74) *Attorney, Agent, or Firm* — McDermott Will & Emery LLP

(57) ABSTRACT

An imaging device includes an imaging unit including a plurality of pixels, respectively including photoelectric converters and charge accumulation nodes that accumulate signal charge. The imaging unit outputs image data based on signals corresponding to the signal charge accumulated in the charge accumulators. The imaging device includes an image processing unit that processes the image data output by the imaging unit. The imaging unit sequentially outputs a plurality of pieces of image data in one frame period by performing readout nondestructively. The image processing unit generates difference image data by determining a difference between two pieces of image data, selects output image data from initial image data and the difference image data, and combines the output image data and normal readout image data included in the plurality of pieces of image data, to generate combination-result image data.

12 Claims, 16 Drawing Sheets

(51) Int. Cl.
*H04N 25/767* (2023.01)
*H04N 25/589* (2023.01)
*H04N 23/741* (2023.01)

(58) Field of Classification Search
CPC ........ H04N 23/70; H04N 23/71; H04N 23/72; H04N 23/73; H04N 25/57; H04N 25/571; H04N 25/573; H04N 25/58; H04N 25/581; H04N 25/78
See application file for complete search history.

(56) References Cited

U.S. PATENT DOCUMENTS

| | | | | |
|---|---|---|---|---|
| 2009/0147120 A1* | 6/2009 | Kurane | ................... | H04N 23/72 |
| | | | | 348/311 |
| 2010/0328490 A1* | 12/2010 | Kurane | ................ | H04N 25/583 |
| | | | | 348/584 |
| 2012/0127337 A1* | 5/2012 | Okada | ................... | H04N 23/951 |
| | | | | 348/E9.051 |
| 2013/0293752 A1* | 11/2013 | Peng | ...................... | H04N 25/53 |
| | | | | 348/295 |

FOREIGN PATENT DOCUMENTS

| | | |
|---|---|---|
| JP | 2007-221757 | 8/2007 |
| JP | 2008-099073 | 4/2008 |
| JP | 2010-074584 | 4/2010 |
| JP | 2014-176065 | 9/2014 |
| WO | 2018/124054 | 7/2018 |

* cited by examiner

IMAGING DEVICE AND IMAGE PROCESSING METHOD

BACKGROUND

1. Technical Field

The present disclosure relates to an imaging device and an image processing method.

2. Description of the Related Art

In recent years, charge-coupled device (CCD) sensors, complementary metal-oxide semiconductor (CMOS) sensors, and so on have come into widespread use as solid-state imaging elements for imaging devices that image subjects to generate image data. With the advances in the semiconductor technology, a dynamic range (i.e., a luminance range from a level at which signals are buried in floor noise and cannot be acquired to a saturation level) for light that is incident on those solid-state imaging elements is improving steadily. However, in a situation in which the solid-state imaging elements are actually used, there are cases in which incident light that exceeds a pre-set dynamic range occurs. Thus, technologies for increasing the dynamic range have been actively researched.

Japanese Unexamined Patent Application Publication No. 62-108678 discloses a technology for obtaining a wide dynamic range by combining pieces of image data whose exposure times are different from each other. Also, Japanese Unexamined Patent Application Publication No. 2008-99073 discloses a technology for increasing the dynamic range by combining pieces of image data obtained from imaging cells arranged in one pixel and having different sensitivities.

SUMMARY

One non-limiting and exemplary embodiment provides an imaging device and so on that can effectively increase a dynamic range of an image to be acquired.

In one general aspect, the techniques disclosed here feature an imaging device that includes: an imaging unit that includes a plurality of pixels, respectively including photoelectric converters that generate signal charge and charge accumulators that accumulate the signal charge, and a signal readout circuit that reads out signals corresponding to the signal charge accumulated in the charge accumulators, and outputs image data based on the signals; and a processing circuit that processes the image data output by the imaging unit. The imaging unit sequentially outputs a plurality of pieces of image data in one frame period by performing readout nondestructively a plurality of times; and the processing circuit generates at least one piece of difference image data by determining a difference between two pieces of continuously output image data of the plurality of pieces of image data, selects, as first image data, one piece of image data from initial image data included in the plurality of pieces of image data and output first and the at least one piece of difference image data, based on respective luminance values therein, and combines the first image data and second image data to generate third image data, the second data being included in the plurality of pieces of image data and being other than the initial image data.

The imaging device according to the present disclosure can effectively increase the dynamic range of an image to be acquired.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Knowledge That Led to the Present Disclosure

Before a detailed description of the present embodiment is given, a description will be given of an example of the operation of an imaging device in a known dynamic-range increasing means.

Herein, an image whose dynamic range is increased may be referred to as a "high dynamic range image". Also, obtaining image data associated with an increase in the dynamic range may be referred to as "high dynamic range imaging" and image processing associated with an increase in the dynamic range may be referred to as "high dynamic range processing" or "high dynamic range combining".

For example, a scheme for combining a plurality of pieces of image data acquired under different exposure conditions into one piece of image data has been proposed as a scheme for obtaining a high dynamic range image. In this scheme, for example, the same scene is imaged with two conditions, that is, with a long exposure time and a short exposure time. In an image acquired with a long exposure time, a high-luminance subject portion is more likely to cause highlight clipping owing to excess of the amount of light, whereas a low-luminance subject portion is more brightly shown without being buried in noise. In an image acquired with a short exposure time, a low-luminance subject portion is likely to be buried in noise owing to shortage of the amount of light, whereas a high-luminance subject portion can be captured without highlight clipping. Hereinafter, an image acquired with a long exposure time may be referred to as a "long-time exposure image". Also, an image acquired with a short exposure time may be referred to as a "short-time exposure image". It is possible to obtain a high dynamic range image by combining pieces of image data of images into one piece of image data so that a high-luminance portion and a low-luminance portion are respectively represented by a short-time exposure image and a long-time exposure image.

Figure 1:
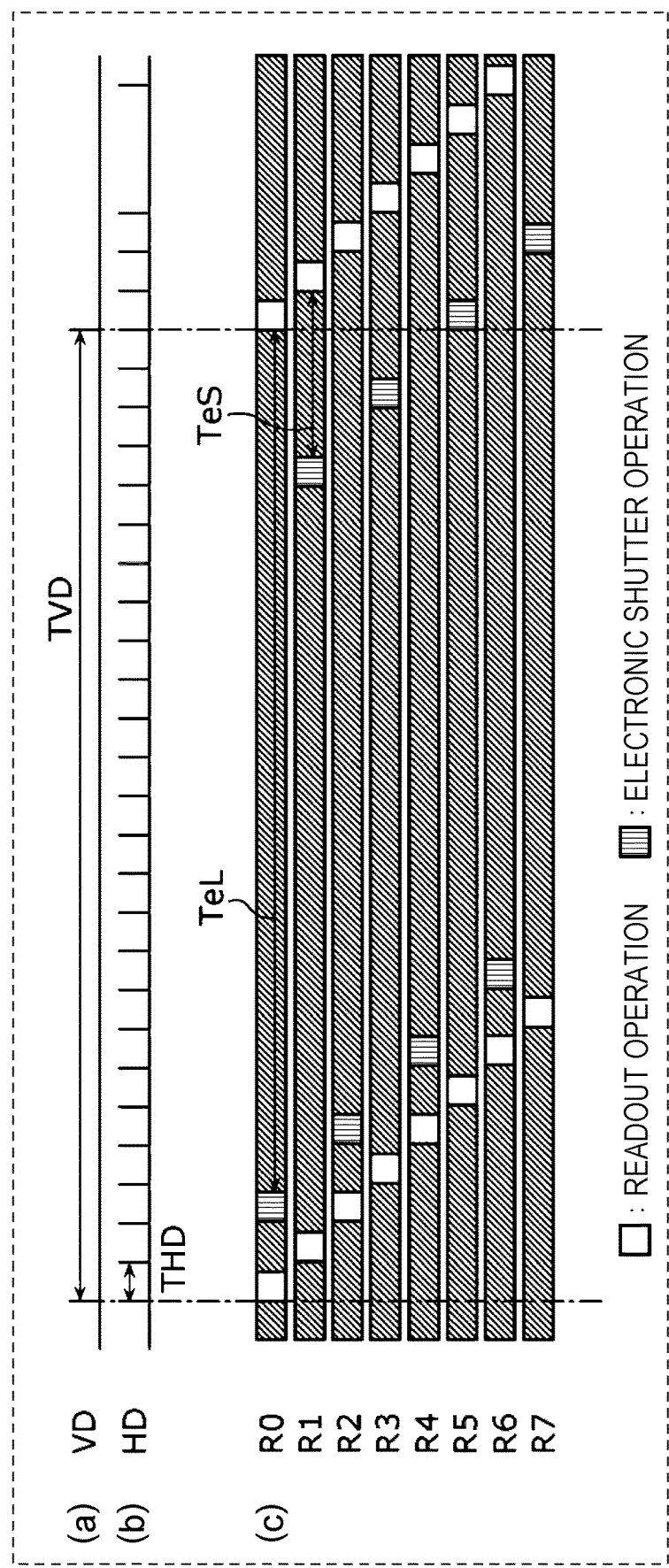
FIG. 1 is a timing chart illustrating an example of operation timings of an imaging device according to a comparative example.

A plurality of pieces of image data whose exposure conditions are different can be obtained, for example, by performing imaging with exposure times that are different for respective pixels in an imaging plane in an imaging element. FIG. 1 is a timing chart illustrating an example of the operation timing of an imaging device according to a comparative example when the imaging device performs imaging with exposure times that differ for respective rows in the imaging device. FIG. 1 illustrates a rolling shutter operation for sequentially performing exposure and readout for each horizontal row of pixels in a CMOS sensor.

Part (a) in FIG. 1 is a graph illustrating timing of falling (or rising) of a vertical synchronization signal VD. Part (b) in FIG. 1 is a graph illustrating timing of falling (or rising) of a horizontal synchronization signal HD. Part (c) in FIG. 1 is a graph illustrating timings of a readout operation and a shutter operation in each horizontal pixel row with respect to horizontal pixel rows from an R0th row to an R7th row in the imaging element. In the graph for each horizontal pixel row in part (c) in FIG. 1, a readout operation of the pixels is performed at a timing indicated by white rectangles, and an electronic shutter operation is performed at a timing indicated by rectangles with vertical lines. That is, the exposure period of the pixels belonging to each horizontal pixel row is a period from the end of the shutter operation until the start of a next readout operation in the horizontal pixel row.

In the example illustrated in FIG. 1, the exposure time of the pixels belonging to the R0th row, an R2nd row, an R4th row, and an R6th row is an exposure time TeL. Also, the exposure time of the pixels belonging to an R1st row, an R3rd row, an R5th row, and the R7th row is an exposure time TeS illustrated in FIG. 1. In FIG. 1, the exposure time TeL is longer than the exposure time TeS. Imaging is performed with exposure times that are different for the respective pixels, and output image data obtained from the pixels that perform imaging with the exposure time TeL and output image data obtained from the pixels that perform imaging with the exposure time TeS are combined with each other to thereby obtain a high-dynamic-range image. Hereinafter, the pixels that belong to the R0th row, the R2nd row, the R4th row, and the R6th row and that perform imaging with the exposure time TeL in FIG. 1 are referred to as "long-time exposure pixels", and the pixels that belong to the R1st row, the R3rd row, the R5th row, and the R7th row and that perform imaging with the exposure time TeS are referred to as "short-time exposure pixels".

As can be understood from FIG. 1, a period in exposure of the long-time exposure pixels and exposure of the short-time exposure pixels do not overlap each other occurs in the long-time exposure pixels and short-time exposure pixels. The length of a period in which both the exposures overlap each other, that is, a period in which both the long-time exposure pixels and the short-time exposure pixels are exposed at the same time, is, at most, the exposure time TeS of the short-time exposure pixels. An event that occurs in the period in which the exposure of the long-time exposure pixels and the exposure of the short-time exposure pixels do not overlap each other is recorded to only the long-time exposure pixels and is not recorded to the short-time exposure pixels.

Figure 2:
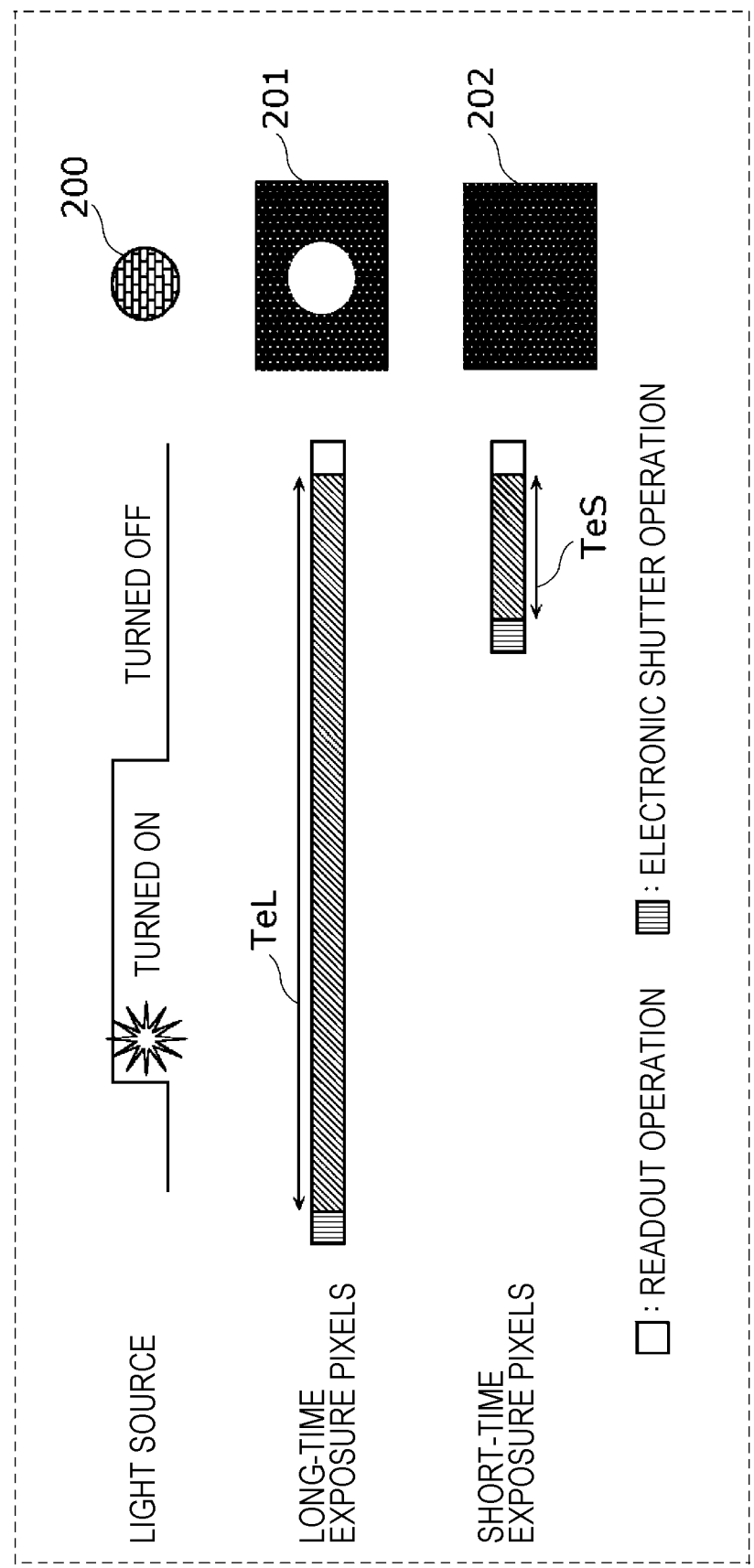
FIG. 2 is a diagram illustrating an example of images acquired by the imaging device according to the comparative example.

FIG. 2 is a diagram illustrating an example of images acquired by the imaging device according to the comparative example. A left side at "light source" in FIG. 2 is a graph illustrating turn-on timing of a light source, and a right side is a view illustrating a light source pattern 200 of the light source. Also, a left side at "long-time exposure pixels" in FIG. 2 is a graph illustrating timing of exposure of the long-time exposure pixels, and a right side is a view illustrating a long-time exposure image 201 acquired by the long-time exposure pixels. Also, a left side at "short-time exposure pixels" in FIG. 2 is a graph illustrating timing of exposure of short-time exposure pixels, and a right side thereof is a view illustrating a short-time exposure image 202 acquired by short-time exposure pixels.

For example, when the light source, which is a subject, has both a period in which it is turned on and a period in which it is turned off, and the light source is turned on only in a period other than the period of the exposure time TeS of the short-time exposure pixels, as illustrated in FIG. 2, light from the light source is captured by only the long-time exposure pixels and is not captured by the short-time exposure pixels. Thus, a situation can occur in which, depending the length of a period in which the light source is turned on, the light-receiving sensitivity of the pixels, the gain setting of output image data, and so on, light from the light source is not shown in the short-time exposure image 202 acquired by the short-time exposure pixels, whereas light from the light source is shown in the long-time exposure image 201, acquired by the long-time exposure pixels, in a highlight clipping state. For example, in the example illustrated in FIG. 2, even when the light source has a pattern like the light source pattern 200, the light source is shown in the long-time exposure image 201 in a highlight clipping state, since the light source is turned on for a certain duration in only a period in which only the long-time exposure pixels perform exposure. On the other hand, the light source is not shown in the short-time exposure image 202. As a result, information on the light source pattern 200 cannot be captured in any of the images. Thus, the light source pattern 200 cannot be depicted by an output image after the combining, and a desired dynamic-range increasing effect cannot be obtained. That is, in the imaging device according to the comparative example, the dynamic-range increasing effect of the imaging device decreases, depending on the lighting situation of a scene to be imaged, and the dynamic range of an image to be acquired cannot be effectively increased.

Accordingly, the present disclosure provides an imaging device that can effectively increase the dynamic range of an image to be acquired. For example, the present disclosure provides an imaging device in which the dynamic-range increasing performance is less likely to decline even when the luminance of a subject like that described above changes over time.

An overview of one aspect of the present disclosure will be described below.

An imaging device according to one aspect of the present disclosure includes: an imaging unit that includes a plurality of pixels, respectively including photoelectric converters that generate signal charge and charge accumulators that accumulate the signal charge, and a signal readout circuit that reads out signals corresponding to the signal charge accumulated in the charge accumulators, and outputs image data based on the signals; and a processing circuit that processes the image data output by the imaging unit. The imaging unit sequentially outputs a plurality of pieces of image data in one frame period by performing readout nondestructively a plurality of times; and the processing circuit generates at least one piece of difference image data by determining a difference between two pieces of continuously output image data of the plurality of pieces of image data, selects, as first image data, one piece of image data from initial image data included in the plurality of pieces of image data and output first and the at least one piece of difference image data, based on respective luminance values therein, and combines the first image data and second image data to generate third image data, the second data being included in the plurality of pieces of image data and being other than the initial image data.

With this arrangement, at least one piece of difference image data with an exposure time that is equivalent to image data acquired with a shorter exposure time than an exposure time in one frame period is generated using a difference between pieces of image data continuously output from the imaging unit. In addition, the first image data is selected from the initial image data and the difference image data, based on the luminance values, and thus, image data that is suitable for use in the high dynamic range combining, for example, image data having a high luminance value, is selected, even for image data with an exposure time that is equivalent to image data acquired with a short exposure time. Then, the first image data and the second image data, which is image data acquired with a longer exposure time than that of the first image data since no difference is determined, are combined to obtain the third image data whose dynamic range is increased. Also, the imaging unit outputs a plurality of pieces of image data by performing readout nondestructively a plurality of times, and thus, even when the luminance of a subject in a scene to be imaged changes over time, image data exposed in a time slot in which the luminance is high is included in the plurality of pieces of image data. Thus, the difference image data also includes image data having large luminance values, even for image data whose exposure time is equivalent to the image data acquired with a short exposure time. That is, since the difference image data having a large luminance value is used for the generation of the third image data as the first image data, the dynamic-range increasing performance is less likely to decline even when the luminance of a subject in a scene to be imaged changes over time. Hence, the imaging device in this aspect can effectively increase the dynamic range of an image to be acquired.

Also, since the first image data and the second image data are pieces of image data output from the imaging unit or difference image data between the pieces of image data, both the first image data and the second image data are image data based on signals of the same pixels. Thus, in order to obtain pieces of image data having different exposure times, the functions of the pixels do not need to be divided in terms of time and position. Hence, the imaging device in this aspect can effectively increase the dynamic range of an image to be acquired, without causing an increase in the frame rate and a decrease in the resolution.

Also, for example, the second image data may be image data included in the plurality of pieces of image data and output last.

Thus, since the second image data is image data with the longest exposure time among the pieces of image data output from the imaging unit, the exposure time of the second image data is ensured, and the third image data in which noise is reduced can be generated, even when the subject has a low-luminance portion.

Also, for example, the processing circuit may select one piece of image data from the initial image data and first difference image data in the frame period, based on respective luminance values therein, the first difference image data being included in the at least one piece of difference image data, and may select the first image data by repeating selecting one piece of image data from the selected image data and newly generated difference image data, based on respective luminance values therein.

With this arrangement, even when the number of pieces of image data output from the imaging unit increases, selecting one piece of image data from two pieces of image data, that is, the selected image data and the newly generated difference image data, is repeated. Hence, the number of pieces of image data held for the selection may be two. Thus, it is possible to reduce the amount of memory needed to store the image data.

Also, for example, the processing circuit may select the previously selected image data as the first image data when a luminance value in the newly generated difference image data is smaller than a luminance value in the previously selected image data.

Thus, when the luminance value in the newly generated difference image data is smaller than the luminance value in the previously selected image data, the signal charge accumulated in the charge accumulators is close to saturation, and thus the possibility that the luminance value in the difference image data has decreased in high. Thus, the possibility that the luminance value in the difference image data that is subsequently generated decreases is also high, and even when the previously selected image data is selected as the first image data without comparison with the difference image data that is subsequently generated, the possibility that the first image data that is selected does not change is high. Hence, selecting the previously selected image data as the first image data eliminates the need for subsequently generating the difference image data, and it is thus possible to speed up the processing and reduce the power consumption.

Also, for example, the processing circuit may include a first memory that stores therein one of two pieces of continuously output image data of the plurality of pieces of image data output by the imaging unit and a second memory that stores therein the other piece of image data; a difference arithmetic circuit that generates difference image data by determining a difference between the two pieces of image data stored in the first memory and the second memory; a third memory that stores therein the initial image data or the difference image data generated by the difference arithmetic circuit, and a comparison circuit that compares a luminance value in the difference image data generated by the difference arithmetic circuit with a luminance value in the initial image data or the difference image data stored in the third memory.

With this arrangement, when two pieces of image data continuously output from the imaging unit are stored in the first memory and the second memory, and the initial image data or the difference image data is stored in the third memory, the comparison circuit compares the luminance values. Hence, the imaging device with a simple configuration can effectively increase the dynamic range of an image to be acquired.

Also, for example, the photoelectric converters may include a first electrode, a second electrode, and a photoelectric conversion layer between the first electrode and the second electrode.

With this arrangement, in the imaging device including a photoelectric converter including a photoelectric conversion layer, the dynamic range of an image to be acquired can be effectively increased.

Also, for example, the photoelectric converters may include a photodiode.

With this arrangement, in the imaging device including a photoelectric converter including a photodiode, the dynamic range of an image to be acquired can be effectively increased.

Also, an image processing method according to one aspect of the present disclosure includes: sequentially inputting a plurality of pieces of image data obtained by performing readout nondestructively in one frame period; determining a difference between two pieces of continuously input image data of the plurality of pieces of image data to generate at least one piece of difference image data; selecting one piece of image data, as first image data, from initial image data included in the plurality of pieces of image data and input first and the at least one piece of difference image data, based on respective luminance values therein; and combining the first image data and second image data to generate third image data, the second data being included in the plurality of pieces of image data and being other than the initial image data.

With this arrangement, at least one piece of difference image data whose exposure time is equivalent to image data acquired with a shorter exposure time than an exposure time in one frame period is generated using a difference between pieces of continuously input image data. In addition, the first image data is selected from the initial image data and the difference image data, based on the luminance values, and thus, image data that is suitable for use in the high dynamic range combining, for example, image data having a high luminance value, is selected, even for image data with an exposure time that is equivalent to image data acquired with a short exposure time. Then, the first image data and the second image data, which is image data acquired with a longer exposure time than that of the first image data since no difference is determined, are combined to obtain the third image data whose dynamic range is increased. Also, readout is nondestructively performed a plurality of times to input a plurality of pieces of image data, and thus, even when the luminance of a subject in a scene to be imaged changes over time, image data exposed in a time slot in which the luminance is high is included in the plurality of pieces of image data. Thus, the difference image data also includes high-luminance image data, even for image data with an exposure time equivalent to image data acquired with a short exposure time. That is, since the difference image data having a large luminance value is used for the generation of the third image data as the first image data, the dynamic-range increasing performance is less likely to decline even when the luminance of a subject in a scene to be imaged changes over time. Hence, the image processing method according to this aspect can effectively increase the dynamic range of an image to be acquired.

Also, for example, the second image data may be image data included in the plurality of pieces of image data and output last in the frame period.

With this arrangement, the second image data is image data whose exposure time is the longest of the plurality of pieces of input image data, and thus, when a subject has a low-luminance portion, the exposure time of the second image data is ensured, and it is possible to generate the third image data in which the noise is reduced.

Also, for example, in the image processing method, one piece of image data may be selected from the initial image data and first difference image data in the frame period, based on respective luminance values therein, the first difference image data being included in the at least one piece of difference image data; and selecting one piece of image data from the selected image data and newly generated difference image data, based on respective luminance values therein, may be repeated to select the first image data.

With this arrangement, even when the number of pieces of input image data increases, selecting one piece of image data from two pieces of image data, that is, the selected image data and the newly generated difference image data, is repeated. Thus, the number of pieces of image data held for the selection may be two. Hence, it is possible to reduce the amount of memory needed to store the image data.

Also, for example, in the image processing method, when a luminance value in the newly generated difference image data is smaller than a luminance value in the previously selected image data, the previously selected image data may be selected as the first image data.

Thus, when the luminance value in the newly generated difference image data is smaller than the luminance value in the previously selected image data, the signal charge accumulated in the charge accumulators is close to saturation, and thus the possibility that the luminance value in the difference image data has decreased in high. Thus, the possibility that the luminance value in the difference image data that is subsequently generated decreases is also high, and even when the previously selected image data is selected as the first image data without comparison with the difference image data that is subsequently generated, the possibility that the first image data that is selected does not change is high. Hence, selecting the previously selected image data as the first image data eliminates the need for subsequently generating the difference image data, and it is thus possible to speed up the processing and reduce the power consumption.

Embodiments of the present disclosure will be described below with reference to the accompanying drawings. The embodiments described below each represent a general or specific example. Numerical values, shapes, materials, constituent elements, the arrangement and the connection forms of constituent elements, steps, the order of steps, and so on described in the embodiments below are examples and are not intended to limit the present disclosure. Various aspects described herein can be combined together, as long as such a combination does not cause contradiction. Also, of the constituent elements in the embodiments described below, the constituent elements not set forth in the independent claims that represent the broadest concept will be described as optional constituent elements. In the following description, constituent elements having substantially the same functions are denoted by the same reference numerals, and descriptions thereof may be omitted.

First Embodiment

First, a description will be given of an imaging device according to a first embodiment.

Overall Configuration of Imaging Device

The imaging device according to the present embodiment has a function for generating image data of a high dynamic range image by using a plurality of pieces of image data resulting from imaging with different exposure times. An imaging unit included in the imaging device according to the present embodiment performs imaging with a predetermined exposure time and also reads out pixel signals nondestructively a plurality of times in the exposure time. In addition, an image processing unit included in the imaging device according to the present embodiment generates difference image data between a plurality of pieces of image data obtained by those nondestructive pixel-signal readouts. One piece of image data is selected from image data obtained first and the difference image data, for example, based on local luminance values in the pieces of image data, and the selected image data and the image data obtained using the imaging with the predetermined exposure time are combined to thereby generate image data of a high dynamic range image.

Figure 3:
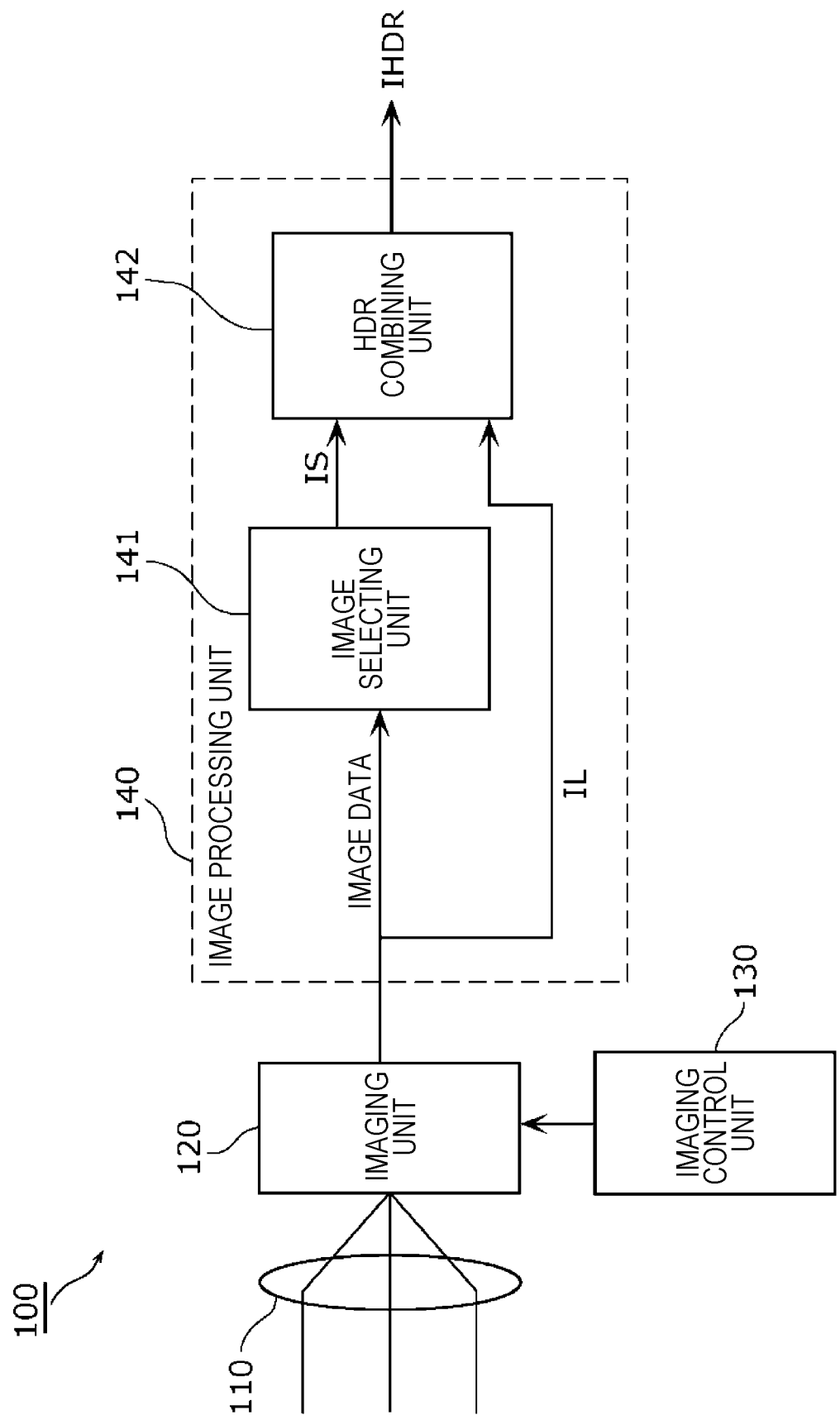
FIG. 3 is a block diagram illustrating an exemplary configuration of an imaging device according to a first embodiment.

FIG. 3 is a block diagram illustrating an exemplary configuration of an imaging device according to the present embodiment. As illustrated in FIG. 3, an imaging device 100 according to the present embodiment includes a lens optical system 110, an imaging unit 120, an imaging control unit 130, and an image processing unit 140. The image processing unit 140 is one example of a processing circuit.

The lens optical system 110 includes, for example, a lens for autofocusing, a lens for zooming, and a diaphragm. The lens optical system 110 focuses light onto an imaging plane of the imaging unit 120.

The imaging unit 120 converts light that is incident through the lens optical system 110 into electrical signals corresponding to the intensity of the light and outputs the electrical signals as image data. In this case, the imaging unit 120 has a function for reading out signals corresponding to incident light intensities without performing a signal reset operation, in other words, for nondestructively reading out signals. That is, the imaging unit 120 performs imaging with a predetermined exposure time, also nondestructively reads out signals of the pixels in the exposure time, and thereby outputs both image data in the middle of the predetermined exposure time, the image data being based on the nondestructive readout, and normal readout image data IL acquired with the predetermined exposure time. That is, in one frame period including the predetermined exposure time, the imaging unit performs readout nondestructively a plurality of times to thereby sequentially output a plurality of pieces of image data in one frame period. The normal readout image data IL is one example of second image data. A detailed configuration of the imaging unit 120 is described later.

The imaging control unit 130 generates signals for controlling the imaging unit 120 and supplies the signals to the imaging unit 120. The signals for controlling the imaging unit 120 include, for example, a vertical synchronization signal (VD), a horizontal synchronization signal (HD), and a trigger signal for starting nondestructive readout. In the example illustrated in FIG. 3, although the imaging control unit 130 is illustrated separately from the imaging unit 120, they may be fabricated on the same semiconductor substrate. A part or the entirety of the imaging control unit 130 may be included in the imaging unit 120. The imaging control unit 130 is realized by, for example, a dedicated circuit, a processor, a memory, or a combination thereof.

The image processing unit 140 receives a plurality of pieces of image data output from the imaging unit 120 and performs image processing on the plurality of pieces of image data. The image processing unit 140 has an image selecting unit 141 and a high dynamic range (HDR) combining unit 142. The image processing unit 140 is realized by, for example, a dedicated circuit, a processor, a memory, or a combination thereof.

The image selecting unit 141 determines a difference between two pieces of image data that are nondestructively read out and continuously output by the imaging unit 120 on the basis of a control signal from the imaging control unit 130, to thereby generate at least one piece of difference image data. In addition, the image selecting unit 141 selects, as output image data IS, one piece of image data from initial image data, included in the plurality of pieces of image data and output first, and at least one piece of difference image data, based on respective luminance values therein. The output image data IS is one example of first image data. Although details are described below, the output image data IS selected by the image selecting unit 141 corresponds to image data acquired with a shorter exposure time than a predetermined exposure time set in the imaging unit 120 or the imaging control unit 130. That is, the output image data IS of the image selecting unit 141 and the normal readout image data IL acquired with the predetermined exposure time and output from the imaging unit 120 are supplied to the HDR combining unit 142 as image data of a long-time exposure image and image data of a short-time exposure image in the above-described high dynamic range imaging.

The HDR combining unit 142 receives the output image data IS output from the image selecting unit 141 and the normal readout image data IL, which is one piece of image data of the plurality of pieces of image data output from the imaging unit 120. The HDR combining unit 142 combines the output image data IS and the normal readout image data IL to generate combination-result image data IHDR. As a result, the imaging device 100 acquires a high dynamic range image.

Circuit Configuration of Imaging Unit

Figure 4:
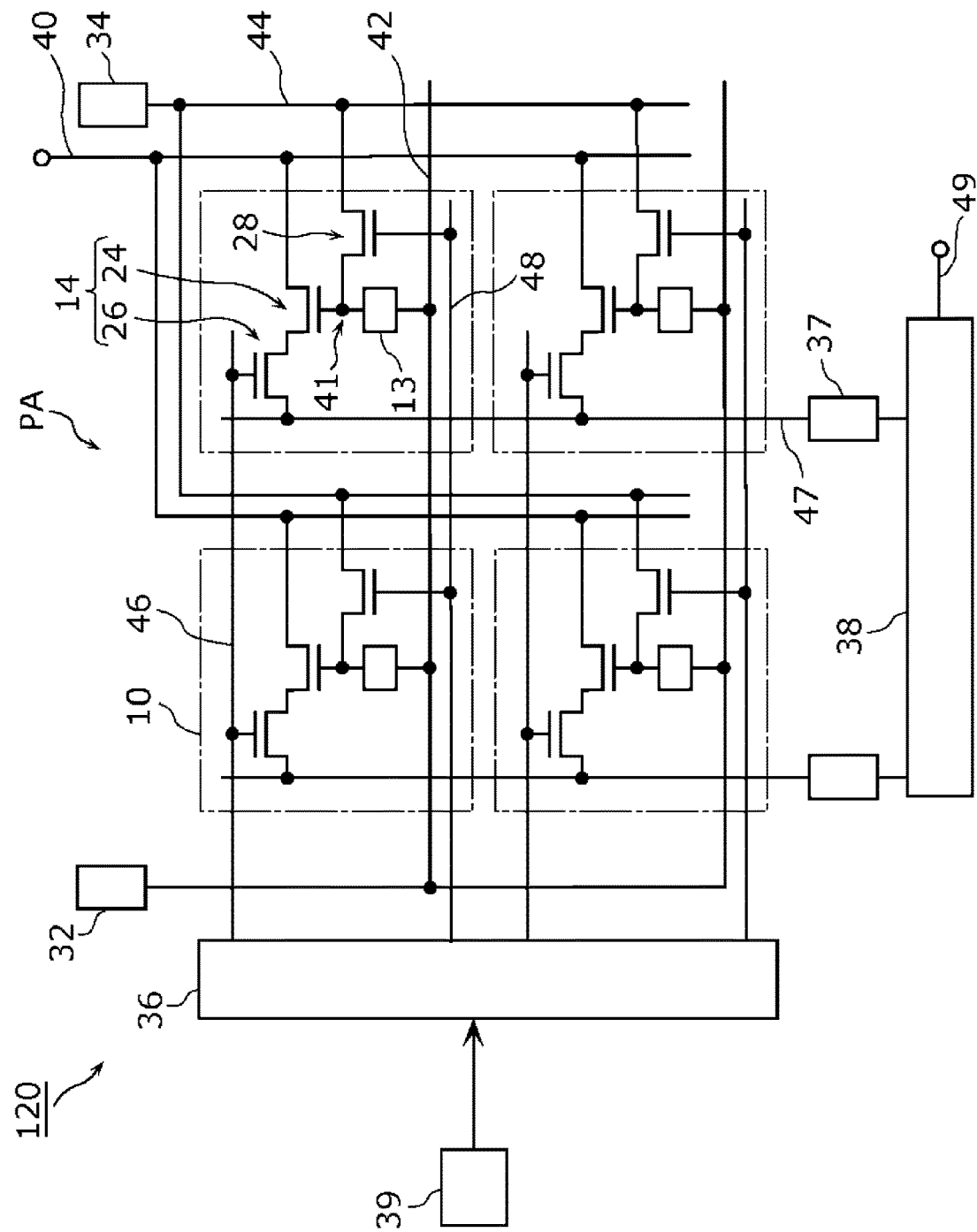
FIG. 4 is a schematic diagram illustrating an exemplary circuit configuration of an imaging unit according to the first embodiment.

Next, a description will be given of a circuit configuration of the imaging unit 120. FIG. 4 is a schematic diagram illustrating an exemplary circuit configuration of the imaging unit 120 according to the present embodiment. The imaging unit 120 illustrated in FIG. 4 has a pixel array PA including a plurality of pixels 10 that are arrayed two-dimensionally. FIG. 4 schematically illustrates an example in which the pixels 10 are arranged in a matrix with two rows and two columns. The number of pixels 10 in the imaging unit 120 and the arrangement thereof are not limited to the example illustrated in FIG. 4. A plane in which these pixels 10 are arrayed two-dimensionally may be referred to as an "imaging plane".

Each pixel 10 has a photoelectric converter 13 and a signal detection circuit 14. As will be described below with reference to the accompanying drawings, the photoelectric converter 13 has a photoelectric conversion layer sandwiched between two electrodes that face each other and generates signal charge upon receiving incident light. The entire photoelectric converter 13 does not necessarily have to be an independent element for each pixel 10, and for example, part of the photoelectric converter 13 may be provided across two or more pixels 10. The signal detection circuit 14 is a circuit that detects the signal charge generated by the photoelectric converter 13. Specifically, the signal detection circuit 14 reads out a signal corresponding to the signal charge accumulated in a charge accumulation node 41 described below. In this example, the signal detection circuit 14 includes a signal detection transistor 24 and an address transistor 26. The signal detection transistor 24 and the address transistor 26 are, for example, field-effect transistors (FET). In this case, N-channel MOSFET (Metal Oxide Semiconductor Field Effect Transistors) are exemplified as the signal detection transistor 24 and the address transistor 26. Transistors, such as the signal detection transistor 24, the address transistor 26, and a reset transistor 28 described below, each have a control terminal, an input terminal, and an output terminal. The control terminal is, for example, a gate. The input terminal is one of a drain and a source and is, for example, a drain. The output terminal is the other of the drain and the source and is, for example, the source.

As schematically illustrated in FIG. 4, the control terminal of the signal detection transistor 24 has electrical connection with the photoelectric converter 13. The signal charge generated by the photoelectric converter 13 is accumulated in the charge accumulation node 41 between the gate of the signal detection transistor 24 and the photoelectric converter 13. Herein, the signal charge is a hole or an electron. The charge accumulation node 41 is one example of a charge accumulator and is also referred to as a "floating diffusion node". Details of the structure of the photoelectric converter 13 are described later.

The imaging unit 120 includes a driver that drives the pixel array PA and to obtain image data at a plurality of timings. The driver includes a voltage supply circuit 32, a reset voltage source 34, a vertical scanning circuit 36, column signal processing circuits 37, and a horizontal signal reading circuit 38.

The photoelectric converter 13 in each pixel 10 has connection with a sensitivity control line 42. In the configuration illustrated in FIG. 4, the sensitivity control line 42 is connected to the voltage supply circuit 32. The voltage supply circuit 32 supplies a predetermined voltage to a counter electrode 12 described below. Also, a voltage that differs from one frame to another may be supplied to the counter electrode 12.

The voltage supply circuit 32 is not limited to a particular power supply circuit, may be a circuit that generates a predetermined voltage, or may be a circuit that converts a voltage, supplied from another power source, into a predetermined voltage.

Each pixel 10 has connection with a power-supply line 40 through which a power-supply voltage VDD is supplied. As illustrated in FIG. 4, an input terminal of each signal detection transistor 24 is connected to the power-supply line 40. The power-supply line 40 serves as a source follower power source, so that the signal detection transistor 24 amplifies signal charge generated by the photoelectric converter 13 and accumulated in the charge accumulation node 41 and outputs the amplified signal charge. This allows the imaging unit 120 to output signals corresponding to signal charge nondestructively accumulated in the charge accumulation nodes 41.

The input terminal of the address transistor 26 is connected to the output terminal of the signal detection transistor 24. The output terminal of the address transistor 26 is connected to one of a plurality of vertical signal lines 47 arranged for respective columns in the pixel array PA. The control terminal of the address transistor 26 is connected to an address control line 46 to control a potential of the address control line 46, so that an output of the signal detection transistor 24 can be selectively read out to the corresponding vertical signal line 47.

In the illustrated example, each address control line 46 is connected to the vertical scanning circuit 36. The vertical scanning circuit 36 is also referred to as a "row scanning circuit". The vertical scanning circuit 36 applies a predetermined voltage to the address control lines 46 to thereby select, for each row, the pixels 10 arranged in the row. As a result, readout of signals in the selected pixels 10 and a reset operation of the charge accumulation nodes 41 are executed.

A pixel drive signal generation circuit 39 is further connected to the vertical scanning circuit 36. In the illustrated example, the pixel drive signal generation circuit 39 generates a signal for driving the pixels 10 arranged in each row in the pixel array PA, and the generated pixel drive signal is supplied to the pixels 10 in the row selected by the vertical scanning circuit 36.

Each vertical signal line 47 is a main signal line through which pixel signals from the pixel array PA are transmitted to a peripheral circuit. The column signal processing circuit 37 is connected to the vertical signal line 47. The column signal processing circuit 37 is also called a "row signal accumulation circuit". The column signal processing circuit 37 performs noise reduction signal processing typified by correlated double sampling, analog-to-digital conversion (AD conversion), and so on. As illustrated in FIG. 4, the column signal processing circuits 37 are provided corresponding to the respective columns of the pixels 10 in the pixel array PA. The horizontal signal reading circuit 38 is connected to the column signal processing circuits 37. The horizontal signal reading circuit 38 is also called a "column scanning circuit". The horizontal signal reading circuit 38 sequentially reads out signals from the plurality of the column signal processing circuits 37 to a horizontal common signal line 49.

In the configuration illustrated in FIG. 4, the pixels 10 have the reset transistors 28. The reset transistors 28 may be, for example, field-effect transistors, as in the signal detection transistors 24 and the address transistors 26. An example in which an N-channel MOSFET is used as each reset transistor 28 will be described below, unless otherwise particularly specified. As illustrated in FIG. 4, the reset transistor 28 is connected between a reset voltage line 44 through which a reset voltage Vr is supplied and the charge accumulation node 41. The control terminal of the reset transistor 28 is connected to a reset control line 48 to thereby control a potential of the reset control line 48, so that a potential of the charge accumulation node 41 can be reset to the reset voltage Vr. In this example, each reset control line 48 is connected to the vertical scanning circuit 36. Accordingly, by applying a predetermined voltage to the reset control lines 48, the vertical scanning circuit 36 can reset, for each row, the plurality of pixels 10 arranged in the row.

In this example, the reset voltage line 44 through which the reset voltage Vr is supplied to the reset transistors 28 is connected to the reset voltage source 34. The reset voltage source 34 is also called a "reset voltage supply circuit". The reset voltage source 34 may have any configuration that can supply the predetermined reset voltage Vr to the reset voltage line 44 during operation of the imaging unit 120 and is not limited to a particular power supply circuit, as in the voltage supply circuit 32 described above. Each of the voltage supply circuit 32 and the reset voltage source 34 may be a part of a single voltage supply circuit or may be an independent separate voltage supply circuit. One of or both the voltage supply circuit 32 and the reset voltage source 34 may be a part of the vertical scanning circuit 36. Alternatively, a sensitivity control voltage from the voltage supply circuit 32 and/or the reset voltage Vr from the reset voltage source 34 may be supplied to each pixel 10 via the vertical scanning circuit 36.

The power-supply voltage VDD of the signal detection circuit 14 can also be used as the reset voltage Vr. In this case, a voltage supply circuit, not illustrated in FIG. 4, that supplies a power-supply voltages to the pixels 10 and the reset voltage source 34 can be shared. Since the power-supply line 40 and the reset voltage line 44 can also be shared, wires in the pixel array PA can be simplified. However, making the reset voltage Vr different from the power-supply voltage VDD of the signal detection circuit 14 allows for more flexible control of the imaging unit 120.

Device Structure of Pixels

Figure 5:
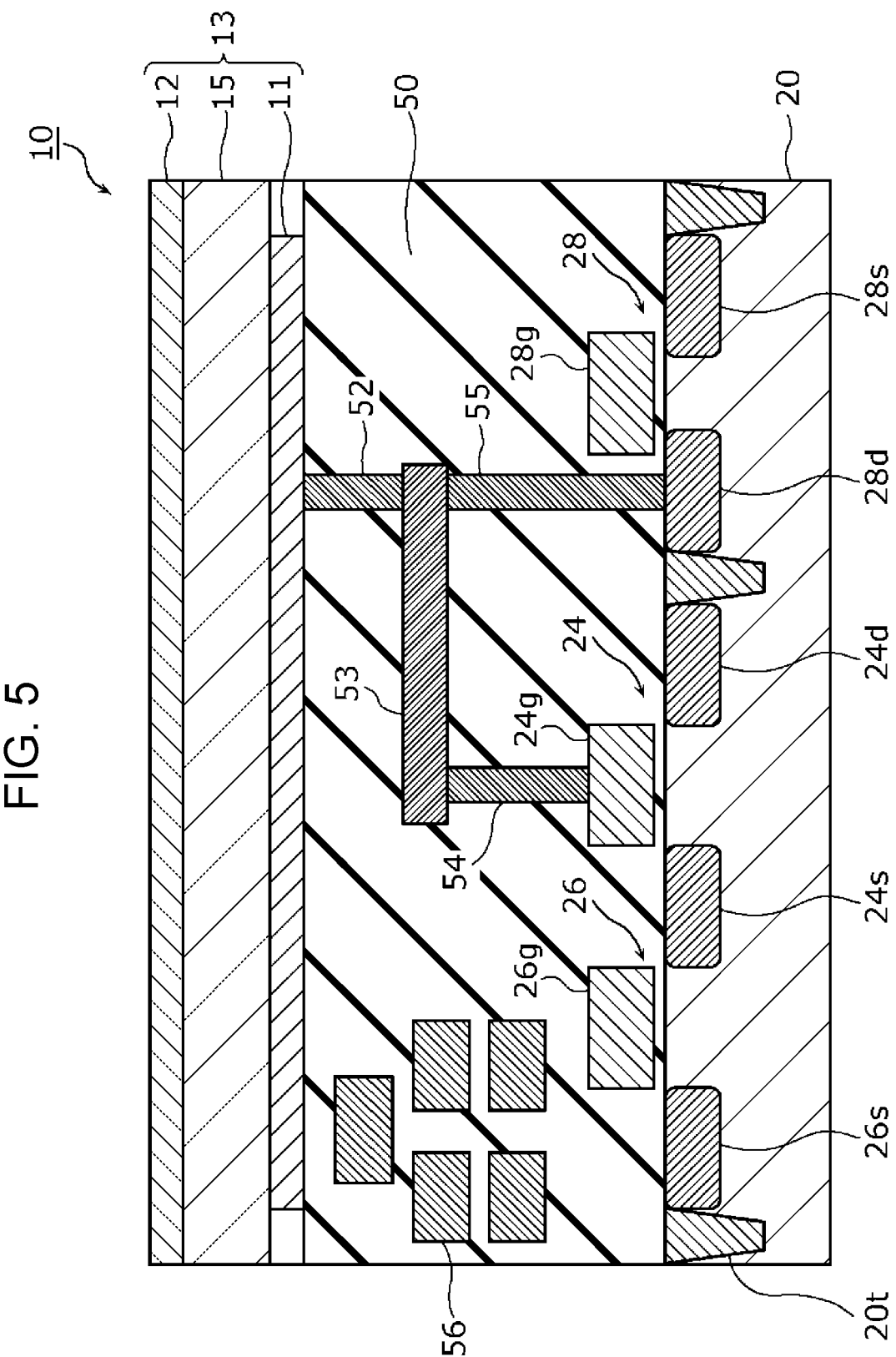
FIG. 5 is a schematic sectional diagram illustrating an exemplary device structure of pixels according to the first embodiment.

Next, a description will be given of a device structure of the pixels 10 in the imaging unit 120. FIG. 5 is a schematic sectional view illustrating an exemplary device structure of one pixel 10 according to the present embodiment. In the configuration illustrated in FIG. 5, the signal detection transistor 24, the address transistor 26, and the reset transistor 28, which are described above, are formed at a semiconductor substrate 20. The semiconductor substrate 20 is not limited to a substrate that is entirely made of semiconductor. The semiconductor substrate 20 may be an insulating substrate or the like having a semiconductor layer at a surface where a photosensitive region is formed. Now, a description will be given of an example in which a P-type silicon (Si) substrate is used as the semiconductor substrate 20.

The semiconductor substrate 20 has impurity regions 26s, 24s, 24d, 28d, and 28s and an element isolation region 20t for providing electrical isolation between the pixels 10. In this case, the impurity regions 26s, 24s, 24d, 28d, and 28s are n-type regions. The element isolation region 20t is also provided between the impurity region 24d and the impurity region 28d. The element isolation region 20t is formed, for example, by ion-implanting an acceptor under a predetermined implantation condition.

The impurity regions 26s, 24s, 24d, 28d, and 28s are, for example, impurity diffusion layers formed in the semiconductor substrate 20. As schematically illustrated in FIG. 5, the signal detection transistor 24 includes the impurity regions 24s and 24d, and a gate electrode 24g. The gate electrode 24g is formed using an electrically conductive material. The electrically conductive material is, for example, polysilicon that is given an electrical conductivity property by doping an impurity or may be a metallic material. The impurity region 24s serves as, for example, a source region of the signal detection transistor 24. The impurity region 24d serves as, for example, a drain region of the signal detection transistor 24. A channel region of the signal detection transistor 24 is formed between the impurity region 24s and the impurity region 24d.

Similarly, the address transistor 26 includes the impurity region 26s, the impurity region 24s, and a gate electrode 26g connected to the corresponding address control line 46 (see FIG. 4). The gate electrode 26g is formed using an electrically conductive material. The electrically conductive material is, for example, polysilicon that is given an electrical conductivity property by doping an impurity or may be a metallic material. In this example, the signal detection transistor 24 and the address transistor 26 share the impurity region 24s and are thus electrically connected to each other. The impurity region 24s serves as, for example, a drain region of the address transistor 26. The impurity region 26s serves as, for example, a source region of the address transistor 26. The impurity region 26s has connection with the vertical signal line 47 (see FIG. 4), which is not illustrated in FIG. 5. The impurity region 24s does not necessarily have to be shared by the signal detection transistor 24 and the address transistor 26. Specifically, the source region of the signal detection transistor 24 and the drain region of the address transistor 26 may be isolated from each other in the semiconductor substrate 20 and may be electrically connected via a wiring layer provided in an interlayer insulating layer 50.

The reset transistor 28 includes the impurity regions 28d and 28s and a gate electrode 28g connected to the corresponding reset control line 48 (see FIG. 4). The gate electrode 28g is formed, for example, using an electrically conductive material. The electrically conductive material is, for example, polysilicon that is given an electrical conductivity property by doping an impurity or may be a metallic material. The impurity region 28s serves as, for example, a source region of the reset transistor 28. The impurity region 28s has connection with the reset voltage line 44 (see FIG. 4), which is not illustrated in FIG. 5. The impurity region 28d serves as, for example, a drain region of the reset transistor 28.

The interlayer insulating layer 50 is arranged above the semiconductor substrate 20 so as to cover the signal detection transistor 24, the address transistor 26, and the reset transistor 28. The interlayer insulating layer 50 is formed of, for example, insulating material, such as silicon dioxide. As illustrated in FIG. 5, wiring layers 56 are arranged in the interlayer insulating layer 50. The wiring layers 56 are formed of, for example, metal, such as copper, and may partly include, for example, a signal line, such as the above-described vertical signal line 47, or a power-supply line. The number of insulating layers in the interlayer insulating layer 50 and the number of layers included in the wiring layers 56 arranged in the interlayer insulating layer 50 can be arbitrarily set and are not limited to the example illustrated in FIG. 5.

The above-described photoelectric converter 13 is arranged above the interlayer insulating layer 50. In other words, in the present embodiment, the plurality of pixels 10 that constitute the pixel array PA (see FIG. 4) are formed in the semiconductor substrate 20 and above the semiconductor substrate 20. The plurality of pixels 10 two-dimensionally arrayed above the semiconductor substrate 20 form a photosensitive region. The photosensitive region is also called a pixel region. The distance between two adjacent pixels 10, that is, the pixel pitch, is, for example, about 2 μm.

The photoelectric converter 13 includes a pixel electrode 11, the counter electrode 12, and a photoelectric conversion layer 15 arranged therebetween. The pixel electrode 11 is one example of a first electrode, and the counter electrode 12 is one example of a second electrode. In the illustrated example, the counter electrode 12 and the photoelectric conversion layer 15 are formed across two or more pixels 10. Meanwhile, the pixel electrodes 11 are provided for the respective pixels 10, and each pixel electrode 11 is spatially isolated from the pixel electrodes 11 in other adjacent pixels 10 and is thus electrically isolated from the pixel electrodes 11 in the other pixels 10.

The counter electrode 12 is, for example, a transparent electrode formed of a transparent electrically conductive material. The counter electrode 12 is arranged at a light incidence side of the photoelectric conversion layer 15. Accordingly, light that passes through the counter electrode 12 is incident on the photoelectric conversion layer 15. Light detected by the imaging unit 120 is not limited to light in a visible-light wavelength range. For example, the imaging unit 120 may detect infrared or ultraviolet. The visible-light wavelength range, for example, is larger than or equal to 380 nm and is smaller than or equal to 780 nm. The "transparent" as used herein means transmitting at least part of light in a wavelength range to be detected and does not necessarily have to transmit light in the entire visible-light wavelength range. Herein, all electromagnetic waves including infrared and ultraviolet are referred to as "light", for the sake of convenience. For example, a transparent conducting oxide (TCO), such as indium tin oxide (ITO), indium zinc oxide (IZO), aluminum-doped zinc oxide (AZO), fluorine-doped tin oxide (FTO), stannic oxide ($SnO_2$), titanium dioxide ($TiO_2$), or zinc peroxide ($ZnO_2$), can be used for the counter electrode 12.

Upon receiving incident light, the photoelectric conversion layer 15 generates hole-electron pairs. The photoelectric conversion layer 15 is formed of, for example, an organic semiconductor material.

As described above with reference to FIG. 4, the counter electrode 12 has connection with the corresponding sensitivity control line 42 connected to the voltage supply circuit 32. Also, in this case, the counter electrode 12 may be formed across two or more pixels 10. Accordingly, a sensitivity control voltage having a desired magnitude can be applied from the voltage supply circuit 32 to two or more pixels 10 through the sensitivity control line 42 at a time. When a sensitivity control voltage having a desired magnitude can be applied from the voltage supply circuit 32, the counter electrode 12 may be separately provided for each pixel 10. Similarly, the photoelectric conversion layer 15 may be separately provided for each pixel 10.

Each pixel electrode 11 is an electrode for collecting signal charge generation by the photoelectric converter 13. At least one pixel electrode 11 is provided for each pixel 10. The pixel electrode 11 is arranged so as to face the counter electrode 12. Controlling the potential of the counter electrode 12 relative to the potential of the pixel electrode 11 allows the pixel electrode 11 to collect, as signal charge, either holes, which are positive charge, or electrons, which are negative charge, of hole-electron pairs generated in the photoelectric conversion layer 15 by photoelectric conversion. For example, when holes are used as the signal charge, making the potential of the counter electrode 12 higher than the potential of the pixel electrode 11 allows the pixel electrode 11 to selectively collect holes. Also, the amount of signal charge collected per unit time changes according to the potential difference between the pixel electrode 11 and the counter electrode 12. A case in which holes are used as the signal charge will be described below by way of example. Electrons can also be used as the signal charge. In this case, the potential of the counter electrode 12 may be made lower than the potential of the pixel electrode 11.

The pixel electrode 11 is formed of metal, such as aluminum or copper, metal nitride, or polysilicon or the like given an electrical conductivity property by doping an impurity.

The pixel electrode 11 may be an electrode having a light-shielding property. For example, a sufficient light-shielding property can be realized by forming a tantalum nitride (TaN) electrode having a thickness of 100 nm as the pixel electrode 11. When the pixel electrode 11 is an electrode having a light-shielding property, it is possible to suppress incidence of light that passes through the photoelectric conversion layer 15 on the channel region or the impurity region of each transistor formed at the semiconductor substrate 20. In the illustrated example, the transistor is at least one of the signal detection transistor 24, the address transistor 26, and the reset transistor 28. The wiring layers 56 described above may be used to form a light-shielding film in the interlayer insulating layer 50. When the incidence of light on the channel region of the transistor formed at the semiconductor substrate 20 is suppressed by the electrode having a light-shielding property or the light-shielding film, for example, it is possible to suppress shifting or the like of transistor characteristics, such as variations in a threshold voltage of the transistor. Also, when incidence of light on the impurity region formed at the semiconductor substrate 20 is suppressed, it is possible to suppress noise mixing caused by unintended photoelectric conversion in the impurity region. The suppression of light incidence on the semiconductor substrate 20 contributes to improving the reliability of the imaging unit 120.

As schematically illustrated in FIG. 5, the pixel electrode 11 is connected to the gate electrode 24g of the signal detection transistor 24 through a plug 52, a wire 53, and a contact plug 54. In other words, the gate of the signal detection transistor 24 has electrical connection with the pixel electrode 11. The plug 52 and the wire 53 may be formed of, for example, metal, such as copper. The plug 52, the wire 53, and the contact plug 54 constitute at least a part of the charge accumulation node 41 (see FIG. 4) between the signal detection transistor 24 and the photoelectric converter 13. The wire 53 may be a part of the wiring layer 56. Also, the pixel electrode 11 is also connected to the impurity region 28d through the plug 52, the wire 53, and a contact plug 55. In the configuration illustrated in FIG. 5, the gate electrode 24g of the signal detection transistor 24, the plug 52, the wire 53, the contact plugs 54 55, and the impurity region 28d, which is one of the source region and the drain region of the reset transistor 28, constitute at least one part of the charge accumulation node 41 and serve as a charge accumulation region in which signal charge collected by the pixel electrode 11 is accumulated.

When the pixel electrode 11 collects the signal charge, a voltage corresponding to the amount of the signal charge accumulated in the charge accumulation node 41 is applied to the gate of the signal detection transistor 24. The signal detection transistor 24 amplifies the voltage. The voltage amplified by the signal detection transistor 24 is selectively read out via the address transistor 26 as a signal voltage. That is, a signal corresponding to the signal charge accumulated in the charge accumulation node 41 is read out. Herein, a signal voltage corresponding to a signal charge accumulated in the charge accumulation node 41 in the pixel 10 may simply be referred to as a "signal" or a "pixel signal".

The imaging unit 120 described above can be manufactured using a general semiconductor manufacturing process. In particular, when a silicon substrate is used as the semiconductor substrate 20, the imaging unit 120 can be manufactured using various types of silicon semiconductor process.

Operation of Imaging Unit

Next, a description will be given of the operation of the imaging device 100 according to the present embodiment. In other words, a description will be given of an image processing method performed by the imaging device 100. First, one example of the operation of the imaging unit 120 will be described below with reference to FIGS. 6 and 7. For simplicity of description, a description will be given of an example of operations when the total number of rows of the pixels 10 included in the pixel array PA is eight rows with an R0th row to an R7th row.

First, a description will be given of obtaining image data in the imaging unit 120. In obtaining the image data, a reset operation for resetting the charge accumulation nodes 41 in the pixels 10 in the pixel array PA and readout of signals corresponding to charge signals accumulated after the reset operation are executed. The imaging unit 120 according to the present embodiment uses both a readout system called "normal readout" and a readout system called "nondestructive readout". In the normal readout, nondestructive readout of pixel signals and a reset operation for resetting the potentials of the charge accumulation nodes 41 for charge accumulation in a next frame period are performed in one readout period. In the nondestructive readout, only nondestructive readout of pixel signals is performed, and a reset operation for performing resetting the potentials of the charge accumulation nodes 41 is not performed. By performing the normal readout and the nondestructive readout, the imaging unit 120 continuously performs readout nondestructively a plurality of times without performing the reset operation, to thereby sequentially output a plurality of pieces of image data in one frame period.

Figure 6:
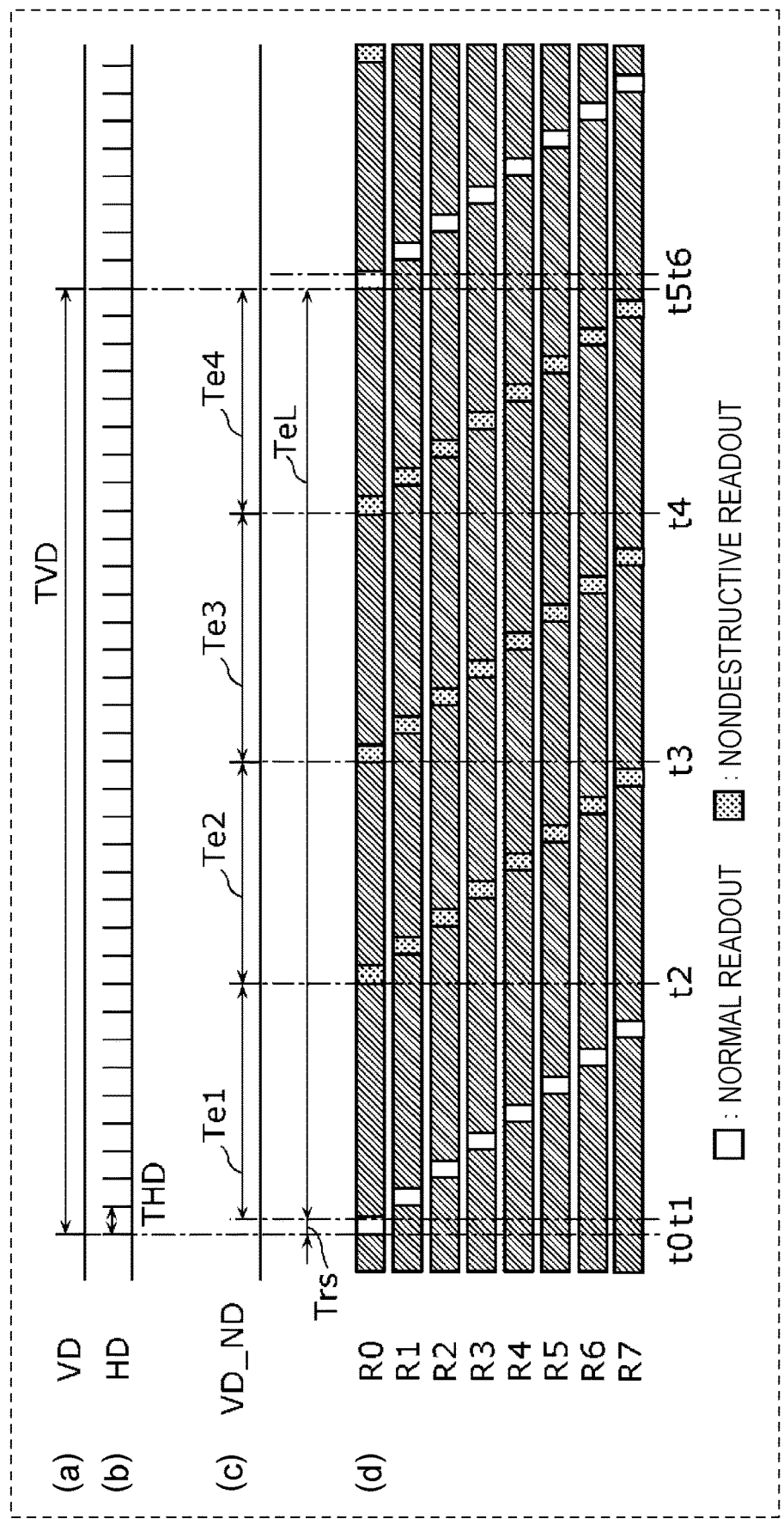
FIG. 6 is a timing chart illustrating one example of the operation of the imaging unit according to the first embodiment.

FIG. 6 is a timing chart illustrating one example of operations in the imaging unit 120 according to the present embodiment. Part (a) in FIG. 6 is a graph illustrating timing of falling (or rising) of the vertical synchronization signal VD. Part (b) in FIG. 6 is a graph illustrating timing of falling (or rising) of the horizontal synchronization signal HD. Part (c) in FIG. 6 is a graph illustrating one example of timing of a nondestructive readout trigger signal VD_ND that specifies a timing at which the nondestructive readout in the imaging unit 120 is performed. Part (d) in FIG. 6 is a graph schematically illustrating a readout timing in a signal readout period in each row in the pixel array PA. In the graph in part (d) in FIG. 6, the normal readout of pixels is performed at a timing indicated by white rectangles, and the nondestructive readout is performed at a timing indicated by rectangles denoted by halftone dots.

For example, the imaging control unit 130 supplies the vertical synchronization signal VD, the horizontal synchronization signal HD, and the nondestructive readout trigger signal VD_ND to the imaging unit 120.

In the example in FIG. 6, one normal readout and three nondestructive readouts are performed in one frame period. The "one frame period" as used herein refers to the period of time TVD between two continuous vertical synchronization signals VD illustrated in part (a) in FIG. 6, in other words, the period from time points t0 to t5 in FIG. 6.

As illustrated in FIG. 6, at time point t0, based on the vertical synchronization signal VD, the imaging unit 120 starts the normal readout of signals in two or more pixels 10 belonging to the R0th row. Thereafter, a first nondestructive readout is started at time point t2, a second nondestructive readout is started at time point t3, and a third nondestructive readout is started at time point t4. Subsequently, at time point t5, the normal readout of signals in two or more pixels belonging to the R0th row is performed based on a next vertical synchronization signal VD. Such normal readout and nondestructive readout are similarly performed for readout of the pixels 10 belonging to the R1st and subsequent rows, as in the pixels 10 belonging to the aforementioned R0th row. A difference from the pixels 10 belonging to the R0th row is that the start time of each readout is shifted rearward by a unit time, for example, by one HD period denoted as a time THD in FIG. 6.

Figure 7:
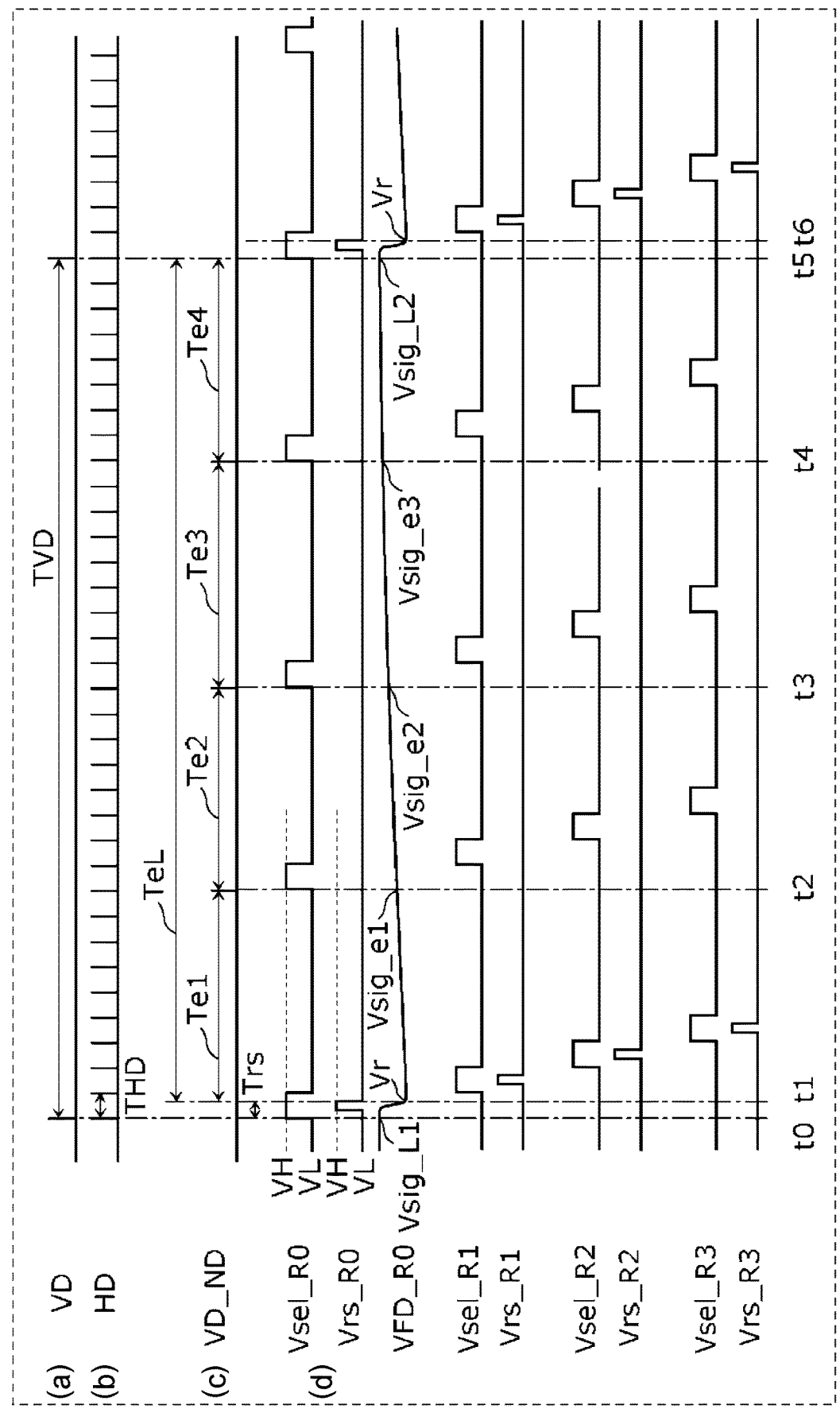
FIG. 7 is a timing chart illustrating one example of control signals in a signal readout period.

FIG. 7 is a timing chart illustrating one example of control signals in the above-described signal readout period. Parts (a), (b), and (c) in FIG. 7 are graphs illustrating timings of falling (or rising) of the vertical synchronization signal VD and the horizontal synchronization signal HD and timing of the nondestructive readout trigger signal VD_ND, similarly to parts (a), (b), and (c) in FIG. 6. In part (d) in FIG. 7, "Vsel_R0" is a graph illustrating changes over time in a potential Vsel_R0 of the address control line 46 in two or more pixels 10 belonging to the R0th row, "Vrs_R0" is a graph illustrating changes over time in a potential Vrs_R0 of the reset control line 48 in two or more pixels 10 belonging to the R0th row, and "VFD_R0" is a graph illustrating changes over time in potentials VFD_R0 of the charge accumulation nodes 41 in particular pixels 10 belonging to the R0th row. In part (d) in FIG. 7, "Vsel_R1", "Vrs_R1", "Vsel_R2", "Vrs_R2", "Vsel_R3", and "Vrs_R3" are graphs illustrating changes over time in the potential of the address control line 46 and changes over time in the potential of the reset control line 48 in two or more pixels 10 belonging to the R1st row, the R2th row, and the R3rd row, as in "Vsel_R0" and "Vrs_R0".

In the signal readout period, first, the normal readout is performed. In the normal readout, first, at time point t0, based on the vertical synchronization signal VD, the potential Vsel_R0 of the address control line 46 in the R0th row is set to a high level, specifically, to a potential VH indicated at "Vsel_R0" in FIG. 7, to thereby turn on the address transistors 26 whose gates are connected to the address control line 46. Signal voltages corresponding to the potentials VFD_R0 of the charge accumulation nodes 41, specifically, pixel signal potentials Vsig_L1 corresponding to the amounts of signal charge accumulated in the charge accumulation nodes 41 before time point t0, are output to the vertical signal lines 47 and are transmitted to the column signal processing circuits 37. That is, the pixel signals in the pixels 10 in the R0th row are read out.

After the above-described readout of the pixel signals in the pixels 10 is completed, for example, AD conversion of pixel signals in the column signal processing circuits 37 is completed, a reset operation of the pixels 10 belonging to the R0th row is performed in the same normal readout period, according to a procedure described below. First, the potential Vrs_R0 of the reset control line 48 in the R0th row is set to the high level, specifically, to a potential VH indicated at "Vrs_R0" in FIG. 7, to thereby turn on the reset transistors 28 whose gates are connected to the reset control line 48. As a result, the charge accumulation nodes 41 and the reset voltage line 44 are connected to each other, and the reset voltage Vr is supplied to the charge accumulation nodes 41.

That is, the potentials VFD_R0 of the charge accumulation nodes 41 are reset to the reset voltage Vr. Thereafter, at time point t1 after a time Trs passes from time point t0, the potential Vrs_R0 of the reset control line 48 is set to a low level, specifically, to a potential VL indicated at "Vrs_R0" in FIG. 7, the reset transistors 28 are turned off, and pixel signals after the reset operation are read out from the pixels 10 in the R0th row through the vertical signal lines 47. The pixel signals obtained at this point in time are pixel signals corresponding to the magnitude of the reset voltage Vr.

After the readout of the pixel signals after the above-described reset operation, the potential Vsel_R0 of the address control line 46 is set to a low level, specifically, to a potential VL indicated at "Vsel_R0" in FIG. 7, to turn off the address transistors 26. The signal voltages corresponding to the pixel signal potentials Vsig_L1 and the reset voltage Vr, the signal voltages being read out in this case, are transmitted to the column signal processing circuits 37, and for example, signal processing, such as removing fixed pattern noise through determining differences between signal processing results, is performed.

The time indicated by the time Trs in FIGS. 6 and 7 represents a time from when the normal readout of the above-described pixel signals is started until the reset operation of the potentials of the charge accumulation nodes 41 is completed, and time point t1 after the time Trs passes from time point t0 is the start point of exposure in a next pixel signal readout.

Subsequently, a nondestructive readout is performed. First, at time point t2 after a time Te1 passes from time point t1, the potential Vsel_R0 of the address control line 46 in the R0th row is set to the high level again, based on the nondestructive readout trigger signal VD_ND. This turns on the address transistors 26 whose gates are connected to the address control line 46. The potentials VFD_R0 of the charge accumulation nodes 41 at this point in time are pixel signal potentials Vsig_e1 corresponding to the amounts of charge accumulated in the charge accumulation nodes 41 in the period of time Te1 from time point t1 to time point t2, and signal voltages corresponding to the pixel signal potentials Vsig_e1 are output to the vertical signal lines 47 through the operation of the above-described signal readout and are transmitted to the column signal processing circuits 37.

On the other hand, in a nondestructive readout started at time point t2, the potential Vrs_R0 of the reset control line 48 in the R0th row is not changed from the low level. As a result, the reset transistors 28 whose gates are connected to the reset control line 48 remain in the off state, and the potentials VFD_R0 of the charge accumulation nodes 41 do not change to the reset voltage Vr. Since a reset operation of the potentials VDF_R0 of the charge accumulation nodes 41 is not performed, the signal charge accumulated in the charge accumulation nodes 41 is not destructed upon the readout operation at time point t2, that is, nondestructive readout is performed. At the time when the readout of the potentials VFD_R0 of the charge accumulation nodes 41 is completed, the potential of the address control line 46 is set to the low level to turn off the address transistors 26.

At time point t3 after a time Te2 passes from time point t2 and also at time point t4 after a time Te3 passes from time point t3, nondestructive readout is also performed based on the nondestructive readout trigger signal VD_ND, as in the operation at time point t1. That is, at each of time points t3 and t4, the potential Vsel_R0 of the address control line 46 in the R0th row is set to the high level to turn on the address transistors 26 whose gates are connected to the address control line 46. As a result, at time point t3, signal voltages corresponding to pixel signal potentials Vsig_e2 corresponding to the amounts of charge accumulated in the charge accumulation nodes 41 in the period of "time Te1+time Te2" from time point t1 to time point t3 are output to the vertical signal lines 47 and are transmitted to the column signal processing circuits 37. Also, at time point t4, signal voltages corresponding to pixel signal potentials Vsig_e3 corresponding to the amounts of charge accumulated in the charge accumulation nodes 41 in the period of "time Te1+time Te2+time Te3" from time point t1 to time point t4 are output to the vertical signal lines 47 and are transmitted to the column signal processing circuits 37. In addition, the potential Vrs_R0 of the reset control line 48 in the R0th row is not changed from the low level, and resetting the potentials VDF_R0 of the charge accumulation nodes 41 to the reset voltage Vr is not performed. At the time when the readout of the potentials VFD_R0 of the charge accumulation nodes 41, the readout being started at each of time point t3 and time point t4, is completed, the potential of the address control line 46 is set to the low level to turn off the address transistors 26, as in the readout started at time point t2.

Subsequently, the normal readout is performed again. First, at time point t5, based on a next vertical synchronization signal VD, the potential Vsel_R0 of the address control line 46 in the R0th row is set to the high level to thereby turn on the address transistors 26 whose gates are connected to the address control line 46. The potentials VFD_R0 of the charge accumulation nodes 41 at this point in time are pixel signal potentials Vsig_L2 corresponding to the amounts of charge accumulated in the charge accumulation nodes 41 in the period of "time Te1+time Te2+time Te3+time Te4=exposure time TeL" from time point t1 to time point t5, that is, in the length of a period obtained by subtracting the time Trs from the time TVD of the duration of the vertical synchronization signal VD. Signal voltages corresponding to the potentials VFD_R0 are output to the vertical signal lines 47 through the above-described operation and are transmitted to the column signal processing circuits 37. Also, in the normal readout started at time point t5, a reset operation of the pixels 10 belonging to the R0th row is performed in the same normal readout period, as in the normal readout at time point t0. That is, the potential Vrs_R0 of the reset control line 48 in the R0th row is set to the high level to turn on the reset transistors 28 whose gates are connected to the reset control line 48, so that the potentials VDF_R0 of the charge accumulation nodes 41 are reset to the reset voltage Vr. Thereafter, at time point t6 after the time Trs passes, the potential of the reset control line 48 is set to the low level to turn off the reset transistors 28, and pixel signals after the reset operation are read out from the pixels 10 in the R0th row through the vertical signal lines 47. After the aforementioned readout of the pixel signals, the potential of the address control line 46 is set to the low level to turn off the address transistors 26. In the normal readout started at time point t5, first, signals corresponding to the pixel signal potentials Vsig_L2 are nondestructively read out, and then the potentials VDF_R0 of the charge accumulation nodes 41 are reset.

Readout of the pixels 10 belonging to the R1st and subsequent rows is similarly performed, as in the readout of the pixels 10 belonging to the aforementioned R0th row. A difference from the pixels 10 belonging to the R0th row is that the start time of each readout is shifted rearward by a unit time, for example, by one HD period denoted as a time THD in FIG. 7. Herein, in the description of the operation timings of the imaging device 100, the operation of the imaging unit 120 is given based only on the readout timing of the pixels 10 belonging to the R0th row, and the shift of the readout timing of the pixels 10 belonging to the above-described R1st and subsequent rows may be omitted.

Although, in FIGS. 6 and 7, the nondestructive readout is executed three times in one frame period, the number of nondestructive readouts in one frame period may be one or two or may be four or more. For example, the number of nondestructive readouts may be changed depending on the luminance or the like of a subject in a scene to be imaged.

Although an electronic shutter operation, that is, an operation for discharging charge accumulated in the charge accumulation nodes 41 at a timing in one frame period in order to perform exposure time adjustment of the pixels 10, is not particularly illustrated in FIGS. 6 and 7, for simplicity of description, such an operation may be employed for the imaging unit 120 in the present embodiment. The timing of the electronic shutter operation may be a timing at which at least one nondestructive readout is performed after the electronic shutter operation is finished. For example, the electronic shutter operation for the pixels 10 belonging to the R0th row can be performed at a timing between time point t1 and time point t2 in FIGS. 6 and 7. In this case, the time Te1 of the exposure time of pixel signals obtained using the nondestructive readout at time point t2 has a length of a period from the end of the above-described electronic shutter operation until time point t2.

In the series of operations illustrated in FIG. 7, image data referred to as "normal readout image data" obtained using one normal readout and image data referred to as "nondestructive readout image data" obtained using three nondestructive readouts are obtained in a period corresponding to the time TVD from time point t1 to time point t6. Also, hereinafter, the normal readout image data may be referred to as "normal readout image data IL", three pieces of nondestructive readout image data may be referred to as "nondestructive readout image data Ind1, Ind2, and Ind3" in order with the data obtained earlier first.

As described above, the nondestructive readout image data Ind1 at time point t2 is image data based on pixel signals corresponding to the amounts of charge accumulated in the charge accumulation nodes 41 in the period of the time Te1 after the charge accumulation nodes 41 are reset at time point t1. Similarly, the nondestructive readout image data Ind2 at time point t3 is image data based on pixel signals corresponding to the amounts of charge accumulated in the period of "time Te1+time Te2" from time point t1, and the nondestructive readout image data Ind3 at time point t4 is image data based on pixel signals corresponding to the amounts of charge accumulated in the period of "time Te1+time Te2+time Te3" from time point t1. The normal readout image data IL is image data based on pixel signals corresponding to the amounts of charge accumulated in the exposure time TeL corresponding to the period from time point t1 to time point t5. The imaging unit 120 performs the readout nondestructively a plurality of times without performing a reset operation for resetting the signal charge in the charge accumulation nodes 41, so that the nondestructive readout image data Ind1, Ind2, and Ind3 and the normal readout image data IL are sequentially output to the image processing unit 140 in one frame period as a plurality of pieces of image data. Herein, the plurality of pieces of image data output in one frame period are pieces of image data based on pixel signals corresponding to charge accumulated in the charge accumulation nodes 41 at respective time points in time in one frame period. Specifically, the plurality of pieces of image data output in one frame period are pieces of image data obtained by combining the nondestructive readout image data read out by the nondestructive readout after the charge accumulation nodes 41 are reset in the normal readout and the normal readout image data read out in a next normal readout.

Operation of Image Selecting Unit

Next, the operation of the image selecting unit 141 according to the present embodiment will be described with reference to FIGS. 8, 9A, and 9B. As described above, the image selecting unit 141 sequentially receives the plurality of pieces of image data including the plurality of pieces of nondestructive readout image data and the normal readout image data from the imaging unit 120 in one frame period, determines difference image data between the pieces of image data, and selects one piece of image data from the initial image data, included in the pieces of image data and output first, and at least one piece of the determined difference image data.

Figure 8:
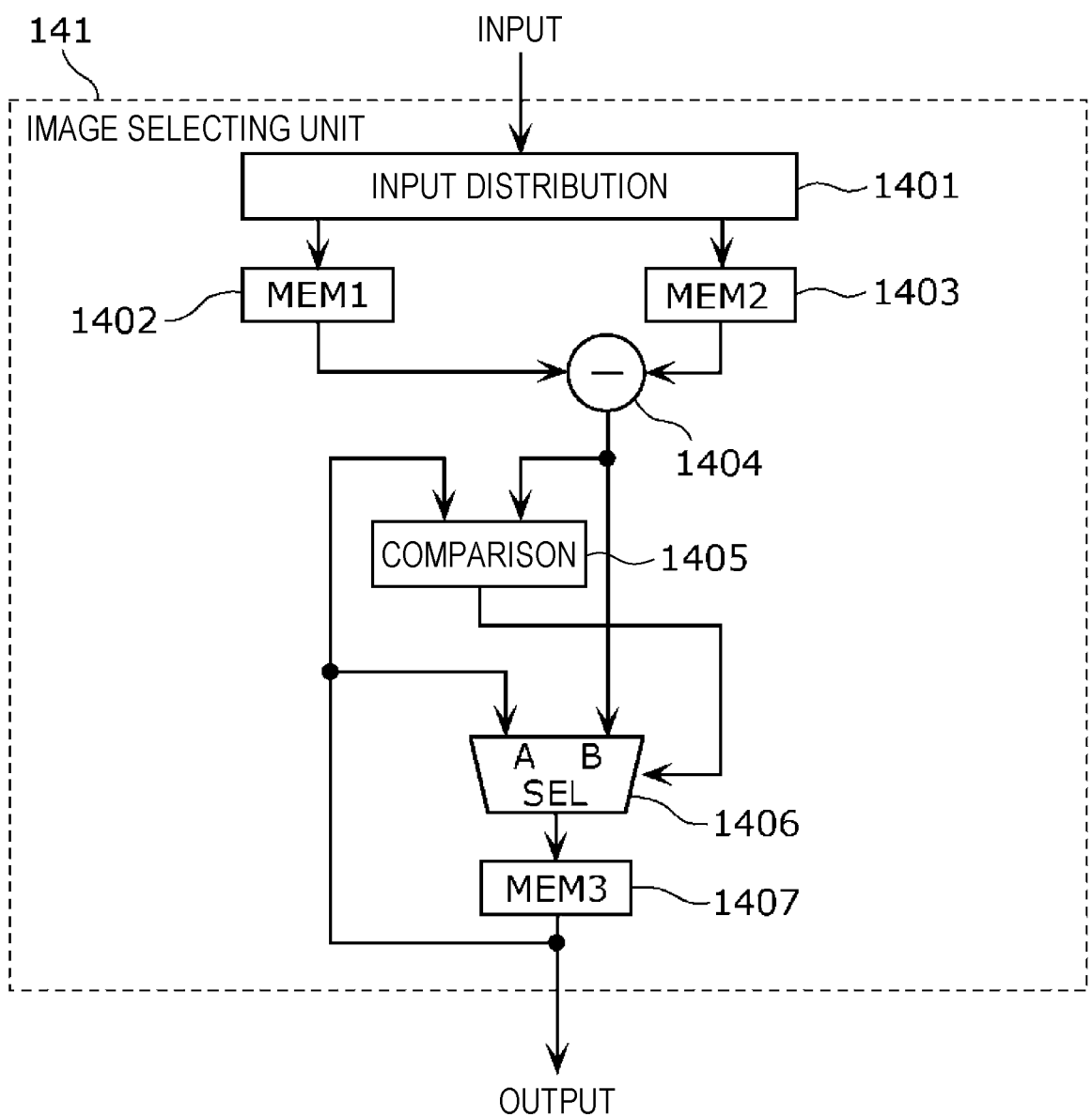
FIG. 8 is a block diagram illustrating an exemplary configuration of an image selecting unit according to the first embodiment.

FIG. 8 is a block diagram illustrating an exemplary configuration of the image selecting unit 141 according to the present embodiment. The image selecting unit 141 in the present embodiment includes an input distributing unit 1401, a frame memory 1402, a frame memory 1403, a subtracting unit 1404, a comparing unit 1405, a selector 1406, and a frame memory 1407. The frame memory 1402 is one example of a first memory and may be hereinafter referred to as a "frame memory MEM1". The frame memory 1403 is one example of a second memory and may be hereinafter referred to as a "frame memory MEM2". The frame memory 1407 is one example of a third memory and may be hereinafter referred to as a "frame memory MEM3". Also, the subtracting unit 1404 is one example of a difference arithmetic circuit, and the comparing unit 1405 is one example of a comparison circuit.

The input distributing unit 1401 stores the pieces of image data, output by the imaging unit 120, in the frame memories MEM1 and MEM2. The image data input to the image selecting unit 141 is transmitted to the input distributing unit 1401 and is selectively stored in either the frame memory MEM1 or the frame memory MEM2. Specifically, one of two pieces of continuously output image data of the plurality of pieces of image data output by the imaging unit 120 is stored in the frame memory MEM1, and the other of the two pieces of image data is stored in the frame memory MEM2. For example, the input distributing unit 1401 alternately stores the plurality of pieces of image data, output by the imaging unit 120, in the frame memory MEM1 and the frame memory MEM2. For storing new image data in the frame memory MEM1 and the frame memory MEM2, the input distributing unit 1401 rewrites the stored image data.

The subtracting unit 1404 calculates difference image data between two pieces of image data stored in the frame memory MEM1 and the frame memory MEM2. That is, the subtracting unit 1404 generates difference image data by determining a difference between two pieces of image data stored in the frame memory MEM1 and the frame memory MEM2. For example, the subtracting unit 1404 appropriately reverses the frame memory MEM1 and the frame memory MEM2 of the subtrahend and minuend targets so that, of the two pieces of image data stored therein, the previously stored image data is subtracted from the subsequently stored image data. The subtracting unit 1404 may also generate the difference image data by determining the absolute value of a difference between the two pieces of image data stored in the frame memory MEM1 and the frame memory MEM2. The subtracting unit 1404 outputs the generated difference image data to the comparing unit 1405 and the selector 1406. In the subtracting unit 1404, when the image data is stored in only one of the frame memory MEM1 and the frame memory MEM2, the subtracting unit 1404 directly outputs the stored image data.

The comparing unit 1405 compares a luminance value in the image data output from the subtracting unit 1404 with a luminance value in the image data stored in a frame memory MEM3 and outputs a selection signal for selecting one piece of image data to the selector 1406. Specifically, the comparing unit 1405 compares the difference image data generated by the subtracting unit 1404 with the initial image data or the difference image data stored in the frame memory MEM3. When the image data is not stored in the frame memory MEM3, the comparing unit 1405 outputs a selection signal for selecting, for example, the difference image data output from the subtracting unit 1404.

The selector 1406 selects one of the image data output from the subtracting unit 1404 and the image data stored in the frame memory MEM3, based on the selection signal supplied from the comparing unit 1405, and stores the selected image data in the frame memory MEM3. The selector 1406 does not have to store the image data in the frame memory MEM3 again, upon receiving a selection signal for selecting the image data stored in the frame memory MEM3.

Image data stored in the frame memory MEM3 at the time when a series of image readouts from the reset operation of the pixels 10 in the imaging unit 120 until a next normal readout and all subsequent image selection operations described below are completed is output to the HDR combining unit 142 as final output image data IS of the image selecting unit 141.

The operation of the image selecting unit 141 according to the present embodiment will be described in detail with reference to FIGS. 9A and 9B. FIGS. 9A and 9B illustrate one example of the operation of the image selecting unit 141 according to the present embodiment. FIG. 9A illustrates a timing chart of the operation of the imaging unit 120. In the operation illustrated in FIGS. 9A and 9B, in one frame period that is started at time point t0, after the reset operation of the pixels 10 is performed at time point t1, it is assumed that through the operation of the imaging unit 120 which is similar to the operation in FIGS. 6 and 7, nondestructive readout is performed at each of time points t2, t3, and t4, and pieces of nondestructive readout image data Ind1, Ind2, and Ind3 are obtained. Thereafter, it is assumed that at time point t5 at which a next normal readout is started, pixel signals corresponding to the charge accumulated in the charge accumulation nodes 41 in one frame period started at time point t0 are read out by the normal readout, and the normal readout image data IL is obtained. The table in FIG. 9B illustrates changes over time in content stored in the three frame memories MEM1, MEM2, and MEM3 included in the image selecting unit 141.

Figure 9:
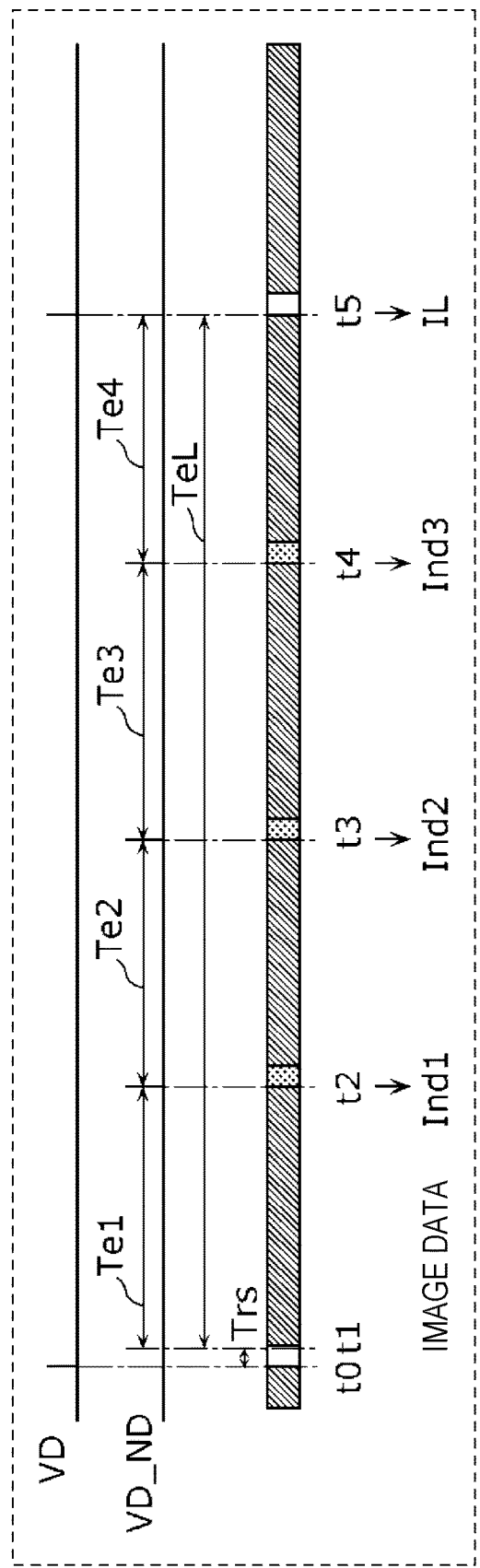
FIGS. 9A and 9B illustrate one example of the operation of the image selecting unit according to the first embodiment.

First, at the timing at which the reset operation of the pixels 10 in the imaging unit 120 is performed, the image selecting unit 141 resets the values stored in the frame memories MEM1, MEM2, and MEM3 to 0 as an initialization operation (step S1 in FIG. 9B). That is, the frame memories MEM1, MEM2, and MEM3 are put into a state in which no image data is stored therein.

Subsequently, the nondestructive readout image data Ind1 is input to the image selecting unit 141 in synchronization with the first nondestructive readout in the imaging unit 120, the first nondestructive readout being started at time point t2. The input distributing unit 1401 stores the input nondestructive readout image data Ind1 in the frame memory MEM1. At this point in time, since 0 has been written in the frame memory MEM2, the subtracting unit 1404 directly outputs the nondestructive readout image data Ind1. The nondestructive readout image data Ind1 is also stored in the frame memory MEM3 via the selector 1406 (step S2 in FIG. 9B). Thus, in step S2, the image selecting unit 141 stores the first-nondestructive-readout image data Ind1 in the frame memory MEM3 as temporary output image data.

Subsequently, in synchronization with the second nondestructive readout in the imaging unit 120 which starts at time point t3, the nondestructive readout image data Ind2 is input to the image selecting unit 141. The input distributing unit 1401 stores the input nondestructive readout image data Ind2 in the frame memory MEM2. The nondestructive readout image data Ind2 stored in the frame memory MEM2 and the nondestructive readout image data Ind1 stored in the frame memory MEM1 in the previous step are input to the subtracting unit 1404. The subtracting unit 1404 subtracts the nondestructive readout image data Ind1 from the nondestructive readout image data Ind2 to generate difference image data Ind2−Ind1. The difference image data Ind2−Ind1 is supplied to one of input ends of the comparing unit 1405. The nondestructive readout image data Ind1 stored in the frame memory MEM3 in step S1 is supplied to the other input end of the comparing unit 1405, and the comparing unit 1405 compares these pieces of image data Ind2−Ind1 and Ind1 and outputs a selection signal for selecting one piece of image data. The two pieces of image data supplied to the comparing unit 1405 are also supplied to the selector 1406, and the selector 1406 selects one of the two pieces of input image data, based on the selection signal output by the comparing unit 1405, and stores the selected image data in the frame memory MEM3. A detailed operation of the comparing unit 1405 is described later. As a result, the image data stored in the frame memory MEM3 is re-written from the first nondestructive readout image data Ind1 stored in step S2 to one of the first nondestructive readout image data Ind1 output from the selector 1406 and the difference image data Ind2−Ind1 output from the subtracting unit 1404 (step S3 in FIG. 9B). The output of the selector 1406 in step S3, that is, the image data stored in the frame memory MEM3, is referred to as "output image data OUT_2". The output image data OUT_2 is temporary output image data of the image selecting unit 141, the temporary output image data being determined in step S3.

Subsequently, in synchronization with a third nondestructive readout in the imaging unit 120 which starts at time point t4, the nondestructive readout image data Ind3 is input to the image selecting unit 141. The input distributing unit 1401 stores the input nondestructive readout image data Ind3 in the frame memory MEM1. That is, the image data stored in the frame memory MEM1 is re-written to the nondestructive readout image data Ind3. The nondestructive readout image data Ind3 stored in the frame memory MEM1 and the nondestructive readout image data Ind2 stored in the frame memory MEM2 in step S3 are input to the subtracting unit 1404. At this point in time, the subtracting unit 1404 reverses the frame memories of the subtrahend and minuend targets with respect to step S3 to generate difference image data Ind3−Ind2. The difference image data Ind3−Ind2 is supplied to one of the input ends of the comparing unit 1405. The output image data OUT_2 stored in the frame memory MEM3 in step S3 is supplied to the other input end of the comparing unit 1405, and the comparing unit 1405 compares these pieces of image data Ind3−Ind2 and OUT_2 and outputs a selection signal for selecting one piece of image data. The two pieces of image data supplied to the comparing unit 1405 are also supplied to the selector 1406, and the selector 1406 selects one of the input two pieces of image data, based on the selection signal output from the comparing unit 1405, and stores the selected piece of image data in the frame memory MEM3. As a result, the image data stored in the frame memory MEM3 is re-written from the output image data OUT_2 stored in step S4 to one of the output image data OUT_2 in step S4 which is output from the selector 1406 and the difference image data Ind3−Ind2 output from the subtracting unit 1404 (step S4 in FIG. 9B). The output of the selector 1406 in step S4, that is, the image data stored in the frame memory MEM3, is referred to as "output image data OUT_3". The output image data OUT_3 is temporary output image data of the image selecting unit 141, the temporary output image data being determined in this step.

As described above, in steps S3 and S4, the subtracting unit 1404 generates difference image data between the Nth nondestructive readout image data and the (N+1)st nondestructive readout image data, where N is an integer greater than or equal to 1. The comparing unit 1405 obtains the generated difference image data and the temporary output image data stored in the frame memory MEM3 at this point in time. The comparing unit 1405 then compares the difference image data with the temporary output image data and outputs a selection signal for selecting the image data having a luminance value. The selector 1406 stores the selected image data in the frame memory MEM3 as new temporary output image data. These operations are repeated until the nondestructive readout in the imaging unit 120 is performed a prescribed number of times in one frame period.

Subsequently, in synchronization with the normal readout in the imaging unit 120 which starts at time point t5, the normal readout image data IL is input to the image selecting unit 141. The input distributing unit 1401 stores the input normal readout image data IL in the frame memory MEM2. That is, the image data stored in the frame memory MEM2 is re-written to the normal readout image data IL. The normal readout image data IL stored in the frame memory MEM2 and the nondestructive readout image data Ind3 stored in the frame memory MEM1 in step S4 are input to the subtracting unit 1404. At this point in time, the subtracting unit 1404 reverses the frame memories of the subtrahend and minuend targets with respect to step S4 to generate difference image data IL−Ind3. The difference image data IL−Ind3 is supplied to one of the input ends of the comparing unit 1405. The output image data OUT_3 stored in the frame memory MEM3 in step S4 is supplied to the other input end of the comparing unit 1405, and the comparing unit 1405 compares these pieces of image data and outputs a selection signal for selecting one of the pieces of image data. The two pieces of image data supplied to the comparing unit 1405 are also supplied to the selector 1406, and the selector 1406 selects one of the input two pieces of image data, based on the selection signal output from the comparing unit 1405, and stores the selected image data in the frame memory MEM3. As a result, the image data stored in the frame memory MEM3 is re-written from the output image data OUT_3 stored in step S4 to one of the output image data OUT_3 in step S4 which is output from the selector 1406 and the difference image data IL−Ind3 output from the subtracting unit 1404 (step S5 in FIG. 9B). The output of the selector 1406 in step S5, that is, the image data stored in the frame memory MEM3, becomes the output image data IS of the image selecting unit 141. The output image data IS in step S5 becomes image data that is eventually output from the image selecting unit 141. The image selecting unit 141 outputs the output image data IS to the HDR combining unit 142.

As described above, in step S5, the subtracting unit 1404 generates the difference image data IL−Ind3 between the final nondestructive readout image data Ind3 and the normal readout image data IL in one frame period. The comparing unit 1405 obtains the generated difference image data IL−Ind3 and the temporary output image data stored in the frame memory MEM3 at this point in time. Then, the comparing unit 1405 compares the difference image data IL−Ind3 with the temporary output image data and outputs a selection signal for selecting the image data having a large luminance value. The selector 1406 stores the selected image data in the frame memory MEM3 as the output image data IS.

As described above, in steps S2 to S5, the nondestructive readout image data Ind1, Ind2, and Ind3, which are a plurality of pieces of image data obtained by the imaging unit 120 performing the readout nondestructively a plurality of times in one frame period, and the normal readout image data IL are sequentially input to the input distributing unit 1401.

Then, in steps S3 to S5, the subtracting unit 1404 determines a difference between two pieces of continuously input image data of the pieces of nondestructive readout image data Ind1, Ind2, and Ind3 and the normal readout image data IL, to thereby generate the difference image data Ind2−Ind1, Ind3−Ind2, and IL−Ind3 as at least one piece of difference image data. The comparing unit 1405 outputs a selection signal for selecting the output image data IS from the nondestructive readout image data Ind1, which is the initial image data included in the nondestructive readout image data Ind1, Ind2, and Ind3 and the normal readout image data IL and output first, and the difference image data Ind2−Ind1, Ind3−Ind2, and IL−Ind3, based on the luminance values therein. Specifically, in step S3, the comparing unit 1405 outputs a selection signal for selecting one of the nondestructive readout image data Ind1 and the difference image data Ind2−Ind1, based on the respective luminance values. In steps S4 and S5, the comparing unit 1405 repeatedly outputs a selection signal for selecting one of the selected image data and newly generated difference image data, based on the luminance values therein, and outputs a selection signal for selecting the output image data IS as an eventually selected image data.

Although details are described below, the HDR combining unit 142 combines the output image data IS and the normal readout image data IL to generate combination-result image data IHDR.

With the configuration illustrated in FIGS. 8, 9A, and 9B, no matter how many times the nondestructive readout is performed in one frame period, it is not necessary to change the hardware configuration needed for the image selecting unit 141. The input distributing unit 1401 alternately distributes the image data, input to the image selecting unit 141, to the two frame memories MEM1 and MEM2 for storage. Carrying image data stored once to the next step to use the image data and rewriting the image data to the newly input image data reduces frame memory resources that are required. Also, the selector 1406 overwrites, in each step, the temporary output image data OUT_2 or OUT_3 stored in the frame memory MEM3, to thereby reduce frame memory resources that are required.

In the image selecting unit 141, the difference image data between the normal readout image data and the nondestructive readout image data or the difference image data between the pieces of nondestructive readout image data is generated. As described above in FIG. 7, for example, the nondestructive readout image data Ind1 at time point t2 is image data based on pixel signals corresponding to the amounts of charge accumulated in the period of the time Te1 after the resetting at time point t1, and the nondestructive readout image data Ind2 at time point t3 is image data based on pixel signals corresponding to the amounts of charge accumulated in the period of "time Te1+time Te2" after the resetting at time point t1. The difference image data Ind2−Ind1, which is a difference between those pieces of data Ind2 and Ind1, is image data based on pixel signals corresponding to the amounts of charge accumulated in the period of time Te2 from time point t2 to time point t3. That is, the operation for determining the difference between the output two pieces of image data obtains image data with an exposure time equivalent to the image data acquired with the exposure time in the time Te2. Similarly, the difference image data Ind3−Ind2, which is a difference between the nondestructive readout image data Ind2 at time point t3 and the nondestructive readout image data Ind3 at time point t4, is image data with an exposure time equivalent to the image data acquired with the exposure time in the time Te3. The difference image data IL−Ind3, which is a difference between the normal readout image data IL at time point t5 and the nondestructive readout image data Ind3 at time point t4, is image data with an exposure time equivalent to the image data acquired with the exposure time in the time Te4. The nondestructive readout image data Ind1 at time point t2 is image data corresponding to pixel signals resulting from exposure and charge accumulation that starts based on the resetting of the pixels 10 at time point t1 and is equivalent to the normal readout image data whose exposure time is the period of the time Te1 from time point t1 to time point t2.

Each of the equivalent exposure times for the above-described difference image data, that is, the time Te1 to the time Te4, is shorter than the exposure time TeL of the normal readout image data IL obtained in the normal readout in the imaging unit 120. Hence, the HDR combining unit 142 performs the combination by using the output image data IS, which is one of these pieces of difference image data, as image data of a short-time exposure image in the high dynamic range imaging and also using the normal readout image data IL as image data of a long-time exposure image in the high dynamic range imaging, to thereby realize high dynamic range image generation.

The total of the times Trs and Te1 and each of the times Te2, Te3, and Te4 are, for example, have the same length. That is, the substantial exposure times of the nondestructive readout image data Ind1 and the difference image data Ind2−Ind1, Ind3−Ind2, and IL−Ind3 are generally the same. The total of the times Trs and Te1 and each of the time Te2, Te3, and Te4 may be made to have lengths different from each other by inserting an electronic shutter operation, changing the interval of the nondestructive readout times, or the like. In such a case, in order to adjust the difference between the exposure times, image data to which a gain is applied as appropriate may be input to the subtracting unit 1404 or the comparing unit 1405.

As described above, the imaging device 100 according to the present embodiment generates the output image data IS of a short-time exposure image in the high dynamic range imaging by performing nondestructive readout in an exposure time for acquiring a long-time exposure image. This is, this means that a long-time exposure image and a short-time exposure image are acquired using the same pixels 10 in the imaging unit 120. For example, in the case of a method for performing imaging while changing the exposure time for each pixel on the imaging plane, like that illustrated in FIG. 1, since the pixels on the imaging plane are divided into the long-time exposure pixels and the short-time exposure pixels, the resolution of an image with each exposure time decreases. In the imaging device 100 according to the present embodiment, since a long-time exposure image and a short-time exposure image are acquired by the same pixels 10, as described above, all the pixels 10 on the imaging plane can be used to acquire images in both the exposure times, and deterioration of the resolution of the images does not occur.

Meanwhile, difference image data generated from pieces of nondestructive readout image data like that described above is not always usable as an alternative to image data acquired with an exposure time equivalent to the exposure time thereof, for example, as an alternative to the normal readout image data obtained at the same timing. This will be described in more detail with reference to FIGS. 10 and 11.

Figure 10:
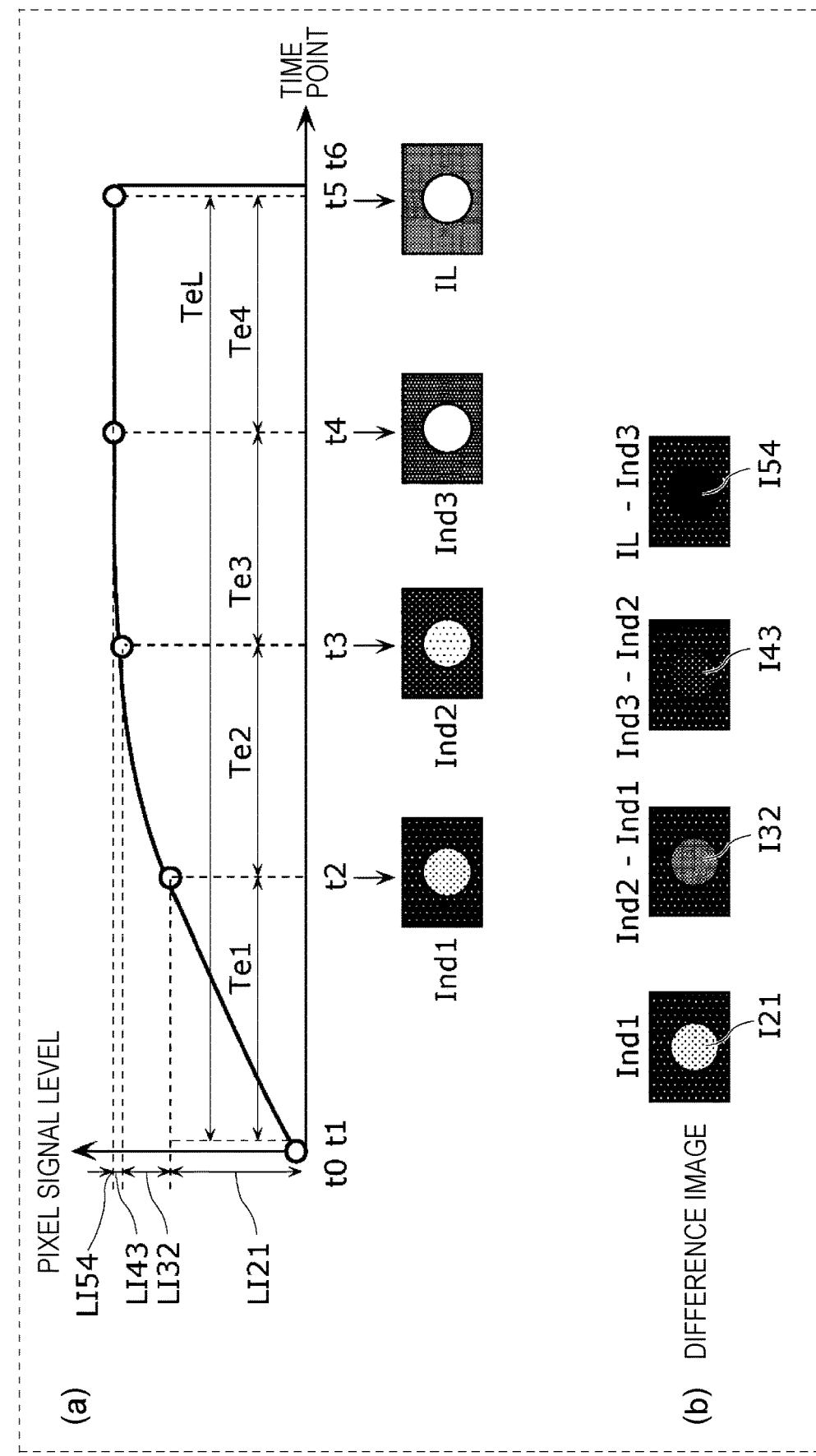
FIG. 10 is a diagram for describing one example of changes in a pixel signal level of charge accumulation nodes according to the first embodiment.

FIG. 10 is a diagram for describing one example of changes in a pixel signal level of the charge accumulation nodes 41. FIG. 10 illustrates a case in which exposure and charge accumulation in each pixel 10 in the imaging unit 120 from resetting of the pixels 10 at time point t1 until time point t5 are performed, nondestructive readout is performed at each of time point t2, time point t3, and time point t4, and normal readout is performed at time point t5, as in the operation of the imaging unit 120 in FIG. 6 or 7. Also, a scene to be imaged is assumed to be a scene at which a circular-shape light source is turned on in a dark background. An upper side in part (a) in FIG. 10 is a graph illustrating the pixel signal level, which is the level of the amounts of charge accumulated in the charge accumulation nodes 41 in the pixels 10 in an area located on the imaging plane and corresponding to the light source. A lower side in part (a) in FIG. 10 is a view illustrating an example of images corresponding to the nondestructive readout image data Ind1, Ind2, and Ind3 and the normal readout image data IL. Part (b) in FIG. 10 is a view illustrating an example of images corresponding to the nondestructive readout image data Ind1 and the difference image data Ind2−Ind1, Ind3−Ind2, and IL−Ind3.

As illustrated in part (a) in FIG. 10, in a state in which there is almost no charge in the charge accumulation nodes 41 in the pixels 10 in the imaging unit 120 immediately after a pixel reset operation, the pixel signal level of a light source portion increases linearly with a gradient of a certain magnitude as the exposure time passes. Thereafter, when the amounts of charge accumulated in the charge accumulation nodes 41 increase and get close to a pixel signal level that is an upper limit of charge that can be accumulated (i.e., the amount of saturation charge), the rate of increase thereof becomes gentle. In addition, thereafter, when the amounts of charge in the charge accumulation nodes 41 in the imaging unit 120 reach the pixel signal level at the upper limit, and no more charge can be accumulated, the pixel signal level does not change. This state is referred to as a "signal saturation state". In FIG. 10, the pixel signal level at the upper limit is the pixel signal level at time point t4 and t5. Not only the charge accumulated in the charge accumulation nodes 41 in the imaging unit 120 but also the signal levels that can be detected by the column signal processing circuits 37 generally have an upper limit, and there are cases in which when signal levels of the column signal processing circuits 37 reach the upper limit, outputs from the imaging unit 120 may be put into a saturation state. In this case, for simplicity of description, a saturation signal level of the column signal processing circuits 37 is assumed to be the same as a saturation pixel signal level of the charge accumulation nodes 41, and luminance values in output image data when the charge accumulated in the charge accumulation nodes 41 reaches the saturation pixel signal level are assumed to be equal to a maximum value of the luminance values that can be output from the imaging unit 120 (i.e., the state of highlight clipping is reached). In this case, images corresponding to the nondestructive readout image data Ind1, Ind2, and Ind3 obtained by the nondestructive readout at time point t2, t3, and t4 and the normal readout image data IL obtained by the normal readout at time point t5 are, for example, the images illustrated at the lower side in part (a) in FIG. 10.

In this case, inside the image selecting unit 141, images corresponding to the difference image data Ind2−Ind1, Ind3−Ind2, and IL−Ind3, which are differences between the pieces of nondestructive readout image data Ind1 Ind2, and Ind3 and the normal readout image data IL, and an image corresponding to the nondestructive readout image data Ind1 are, for example, the images illustrated in part (b) in FIG. 10. The luminance value of the light source portion I21 in the nondestructive readout image data Ind1 corresponds to a pixel signal level LI21 in part (a) in FIG. 10. The luminance value of a light source portion I32 in the difference image data Ind2−Ind1 between the nondestructive readout image data Ind2 and the nondestructive readout image data Ind1 corresponds to a pixel signal level LI32 in part (a) in FIG. 10. The luminance value of a light source portion I43 in the difference image data Ind3−Ind2 between the nondestructive readout image data Ind3 and the nondestructive readout image data Ind2 corresponds to a pixel signal level LI43 in part (a) in FIG. 10. Lastly, the luminance value of a light source portion I54 in the difference image data IL−Ind3 between the normal readout image data IL and the nondestructive readout image data Ind3 corresponds to a pixel signal level LI54 in part (a) in FIG. 10. As can be understood from FIG. 10, magnitude relationships of the pixel signal levels of the nondestructive readout image data Ind1 and the difference image data Ind2−Ind1, Ind3−Ind2, and IL−Ind3 are given by pixel signal levels LI21>LI32>LI43>LI54. Thus, in the nondestructive readout in a state in which a long exposure time passes from the reset operation of the pixels, and the pixel signal level reaches the saturation state, an increase in the pixel signal level which occurs with elapse of the exposure time is reduced. Thus, a corresponding portion is shown darker in the difference image data between the pieces of nondestructive readout image data after a certain exposure time or more passes from the reset operation of the pixels.

Figure 11:
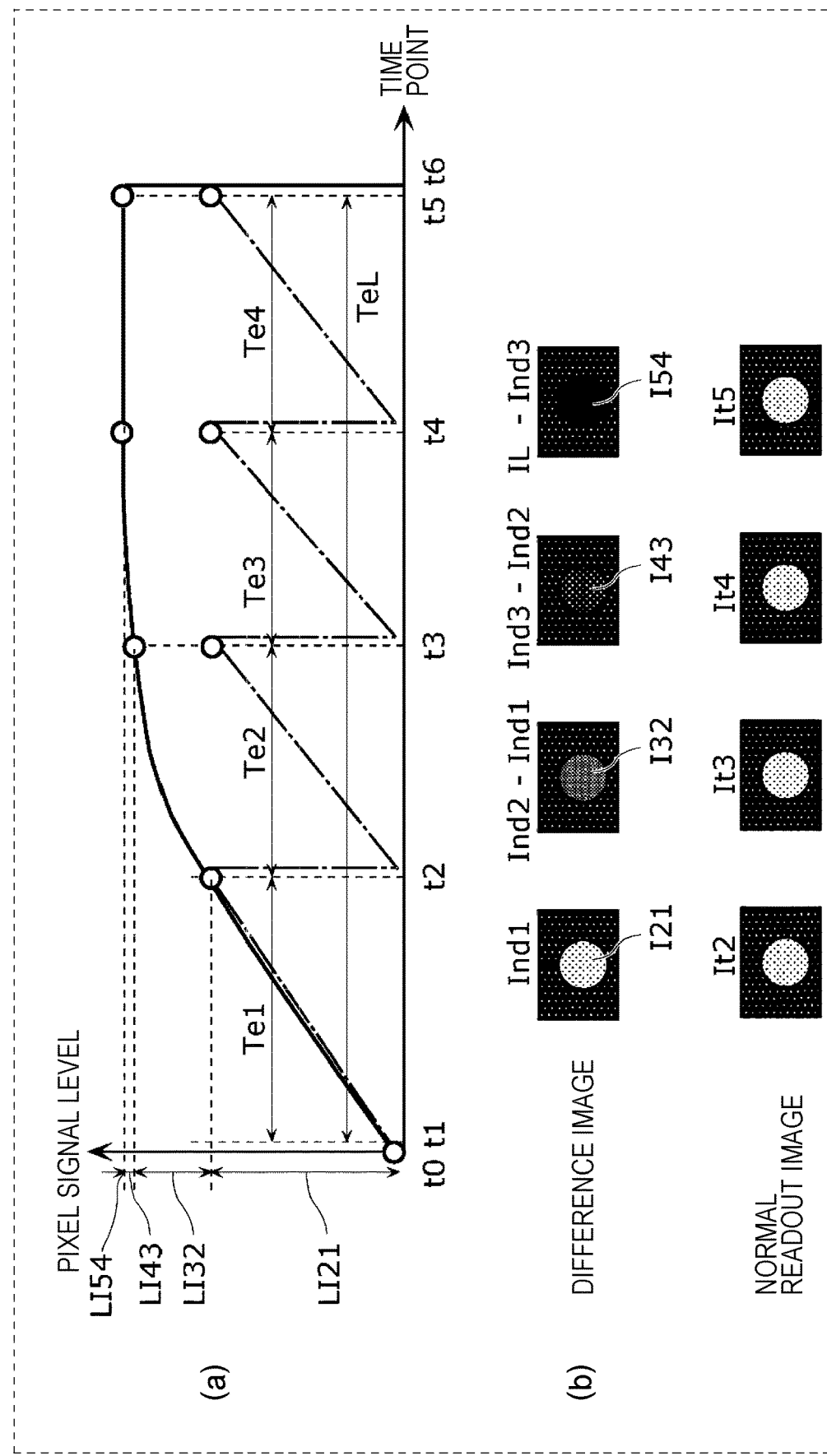
FIG. 11 is a diagram for describing changes in the pixel signal level when nondestructive readout is not performed.

FIG. 11 is a diagram for describing changes in the pixel signal level when the nondestructive readout is not performed. FIG. 11 illustrates images when a scene that is the same as the scene in FIG. 10 is imaged using the nondestructive readout at the same timing as that in FIG. 10 and images when the same scene is imaged using the normal readout at the same timing as that of the nondestructive readout. Part (a) in FIG. 11 is a graph schematically illustrating changes over time in the pixel signal level in each readout system. The pixel signal level when imaging is performed using the nondestructive readout, the pixel signal level being indicated by a solid line plot in part (a) in FIG. 11, increases at time point t1 and enters a saturation state at a certain point in time. In contrast, the pixels 10 are reset each time the normal readout is performed, and, correspondingly, the pixel signal level when imaging is performed using the normal readout, the pixel signal level being indicated by a dashed line plot in part (a) in FIG. 11, returns to a reset level each time the normal readout is performed.

Part (b) in FIG. 11 illustrates an example of images based on image data obtained from time point t2 to time point t5. As described above in the case of FIG. 10, for example, in the images corresponding to the difference image data Ind2−Ind1, Ind3−Ind2, and IL−Ind3, which are differences between the pieces of nondestructive readout image data and are illustrated at the upper side "difference image" in part (b) in FIG. 11, and the image corresponding to the nondestructive readout image data Ind1, which is the initial image data, the later the time of obtaining the nondestructive readout image data used for the difference calculation is, the smaller the luminance values in the difference image data are. In contrast, image data It2, It3, It4, and It5 when imaging is performed using the normal readouts at time point t2, t3, t4, and t5 are image data whose charge accumulation is always started from when the pixel signal level is the reset level. Thus, at any of the readout timings, the pixel signal level increases with a gradient that is equivalent to an increase in the pixel signal level from time point t1 to time point t2. Hence, resulting image data also has luminance values having the same level when the exposure times are equivalent, for example, like images corresponding to the image data It2, It3, It4, and It5 illustrated at "normal readout image" at the lower side in part (b) in FIG. 11. That is, in the method for obtaining image data with a specific exposure time by calculating difference image data between pieces of nondestructive readout image data, when difference image data is calculated from pieces of nondestructive readout image data in a state in which large amounts of charge are accumulated in the charge accumulation nodes 41 in the imaging unit 120 and the accumulated charge is close to the saturation level, luminance values differ from those of image data obtained using the normal readout with the same exposure time. Under such a situation, even when the brightness of a subject does not change, luminance values in the difference image data between the pieces of nondestructive readout image data decrease, and an image in which the subject is shown inappropriately dark is obtained. Accordingly, the difference image data between the pieces of nondestructive readout image data cannot be said to correctly represent the brightness of a subject, and image data that is not suitable for use for a short-time exposure image in the high dynamic range imaging exists.

In the image selecting unit 141 according to the present embodiment selects image data of a short-time exposure image that is suitable for higher dynamic range imaging, not an image that does not correctly represent the brightness of a subject, such as an image in which the luminance level of a subject is shown inappropriately low. More specifically, this operation is realized by the comparing unit 1405, which is described below.

Figure 12:
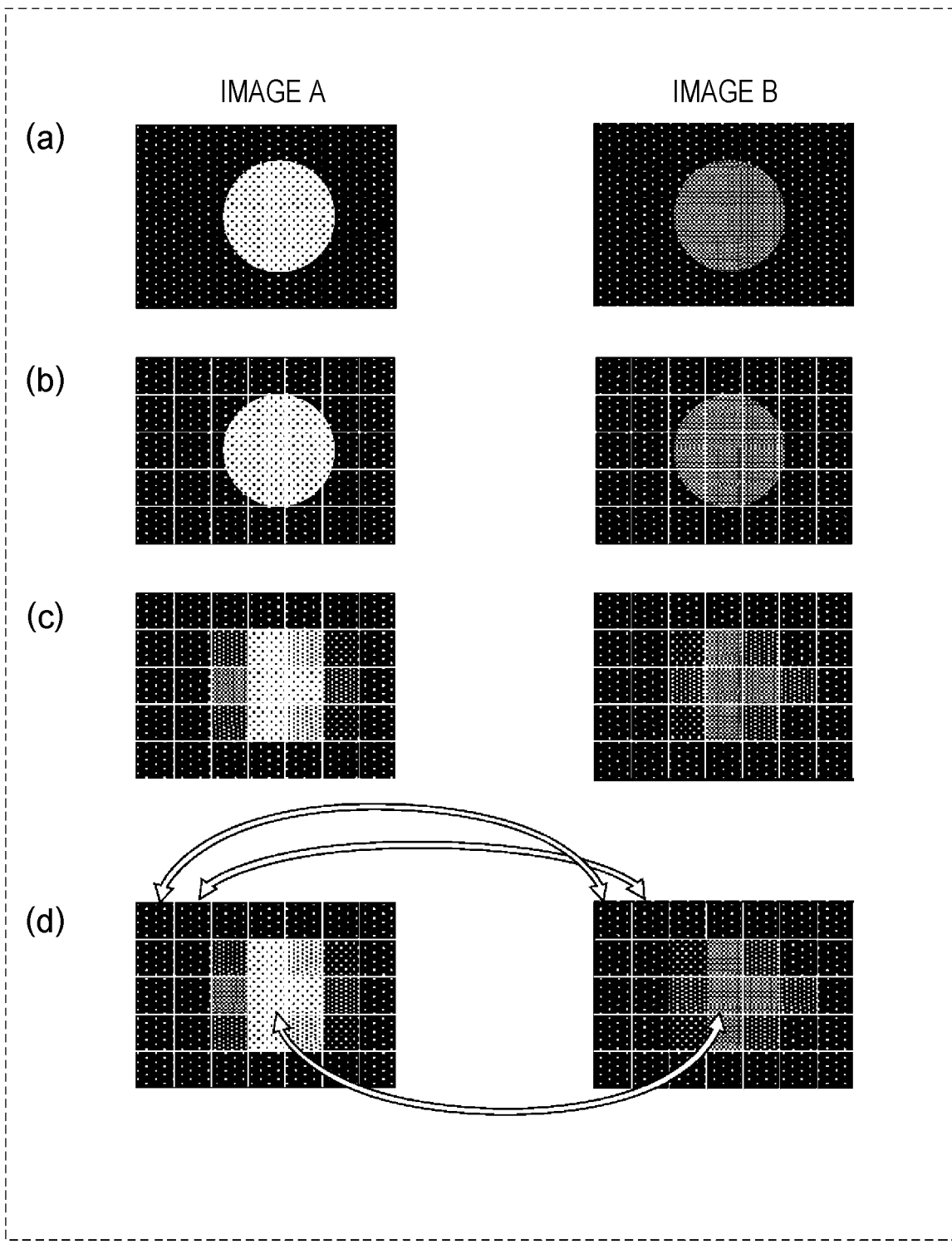
FIG. 12 is a view for describing one example of the operation of a comparing unit according to the first embodiment.

FIG. 12 is a view for describing one example of the operation of the comparing unit 1405 in the image selecting unit 141 according to the present embodiment. For example, in the processing illustrated in FIG. 12, the comparing unit 1405 selects, from the two pieces of image data, image data that is more suitable for the high dynamic range combining. In FIG. 12, a description will be given of a case in which the comparing unit 1405 selects one of image data A and image data B. For example, image data A is stored in the frame memory MEM3, and image data B is difference image data output by the subtracting unit 1404.

First, image data A and image data B of two images illustrated in part (a) in FIG. 12 are input to the comparing unit 1405. Next, as illustrated in part (b) in FIG. 12, the comparing unit 1405 divides the input two pieces of image data into a plurality of blocks having a predetermined size. The "predetermined size" as used herein is, for example, 16 pixels horizontally×16 pixels vertically. In the example illustrated in FIG. 12, the input two pieces of image data are divided into seven blocks in a horizontal direction and five blocks in a vertical direction. Subsequently, as illustrated in part (c) in FIG. 12, the comparing unit 1405 calculates an average value of luminance values for each of the blocks divided into the predetermined size. Thereafter, as illustrated in part (d) in FIG. 12, with respect to each of the blocks in the input two pieces of image data, the average values of the luminance values of the blocks located at the same position are compared with each other, and when the average value of one of the pieces of image data is larger than the average value of the other image data by a predetermined threshold or more, a selection signal for selecting the image data is used an output of the comparing unit 1405. In the example in part (d) in FIG. 12, in the blocks at the center portions of the images, the average value of the luminance values in image data A is larger than that in image data B, and thus, image data A is selected as the output of the comparing unit 1405.

In the operation of the comparing unit 1405 illustrated in FIG. 12, with respect to each block in the input two pieces of image data, the image data having a block with a large luminance value is selected as an output. This method is based on the discussion in FIG. 10. That is, in the difference image data between the pieces of nondestructive readout image data, when the pixel signal level of the pixels 10 at a portion corresponding to the light source, the pixels 10 being included in the imaging unit 120, does not reach the saturation level, and the gradient of an increase in the pixel signal level relative to the exposure time is large, the luminance values in the image data increase. Also, when the pixel signal level of the pixels 10 gets close to or reaches the saturation level, and the gradient of an increase in the pixel signal level relative to the exposure time is small or is substantially zero, the luminance value in the difference image data between the pieces of nondestructive readout image data decreases. Also, naturally, when the light source is turned off, the luminance values of the corresponding portion (except for influences of noise and so on) do not change even if the exposure time is extended, and the luminance values of the corresponding portion in the difference image data between the pieces of nondestructive readout image data become substantially zero.

When this is used, the turning-on state of the light source of a subject or whether or not the charge accumulated in the charge accumulation nodes 41 in the imaging unit 120 is saturated can be detected from the luminance values in the difference image data between the pieces of nondestructive readout image data. A case in which the luminance values in the nondestructive readout image data are large corresponds to a state in which the light source is turned on, and charge accumulated in the charge accumulation nodes 41 in the imaging unit 120 does not reach the amount of saturation charge. On the other hand, a case in which the luminance values in the difference image data between the pieces of nondestructive readout image data are small is thought to correspond to a state in which the charge accumulated in the charge accumulation nodes 41 in the imaging unit 120 gets close to the amount of saturation charge or a state in which the turning-on time of the light source in the exposure time is short. When the luminance values of the light source portion in the difference image data are substantially 0, this state can be regarded as a state in which the light source is turned off or a state in which charge accumulated in the charge accumulation nodes 41 in the imaging unit 120 has reached the amount of saturation charge. As described above, in the high dynamic range imaging that uses both the long-time exposure imaging and the short-time exposure imaging, a bright subject that is likely to cause highlight clipping in the long-time exposure imaging, that is, that is likely to cause saturation in the charge accumulation node 41, is represented using image data acquired with a short-time exposure so that no highlight clipping does not occur. Thus, the image data in the short-time exposure that is used in this case requires that a high-luminance portion be captured without causing saturation in the charge accumulation nodes 41. The luminance values in the difference image data between the nondestructive readout image data and the normal readout image data become small, as the charge accumulated in the charge accumulation nodes 41 gets close to the amount of saturation charge. Thus, the comparing unit 1405 regards, of those pieces of difference image data and initial image data, the image data having larger luminance values as image data in which the light source is turned on, that is far from the saturation state of the accumulated charge, and that is more suitable for the high dynamic range combining. That is, the comparing unit 1405 outputs, to the selector 1406, a selection signal for selecting image data having a larger luminance value from the input two pieces of image data.

Although, in part (b) in FIG. 12, the input image data is divided into blocks having a predetermined size, the above-described comparison operation may be performed based on the average value of the luminance values in the entire image data, without dividing the image data into the blocks. However, when the ratio of an area in which a subject that serves as a light source is shown to an entire screen is low, the rate at which signal changes due to the turned-on state of the light source or the saturation state of the charge accumulation nodes 41 in the imaging unit 120 occupy the average value of luminance values in the entire image data becomes small, and there is a possibility that it is difficult to determine the magnitude relationship of the luminance values, as intended. From the point of view of efficiently detecting more local luminance information, for example, the comparing unit 1405 divides each piece of input image data into a plurality of blocks and compares the luminance values block by block, as described above. Also, the comparing unit 1405 may compare the luminance values of the pixels at the same position in image data A and image data B, instead of the luminance values of the plurality of blocks.

Also, the block size in the block division of the input image data may be set to a fixed size or may be variable, for example, for each frame period. Also, processing for removing flaw components, such as pixel defects, in the imaging unit 120 by performing smoothing processing using a median filter or the like may be added before calculating the average value for each block.

Also, when a block at a position where image data A has a higher average value of the luminance values and a block at a position where image data B has a higher average value of the luminance values coexist in the divided blocks, depending on the position of the block, the comparing unit 1405 may perform the comparison in accordance with a method described above. For example, the comparing unit 1405 may select image data having a larger number of blocks in which the average values of the luminance values are higher. Also, for example, the comparing unit 1405 may select image data including the block having the largest average value of the luminance values. Also, for example, the comparing unit 1405 may compare a value of averaging the average values of the luminance values of the blocks in image data A with a value of averaging the average values of the luminance values in the blocks in image data B and may select the image data having the larger value of averaging the average values of the luminance values. A method for the comparison in the comparing unit 1405 is not limited to those methods and may be any method that can select image data having a high-luminance-value region and being suitable for image data used in the high dynamic range imaging.

Also, in all the blocks, when the difference in the average values of the luminance values between image data A and image data B is small and is smaller than or equal to a threshold, the comparing unit 1405 selects, for example, image data A that is previously selected image data and that is stored in the frame memory MEM3.

Figure 13:
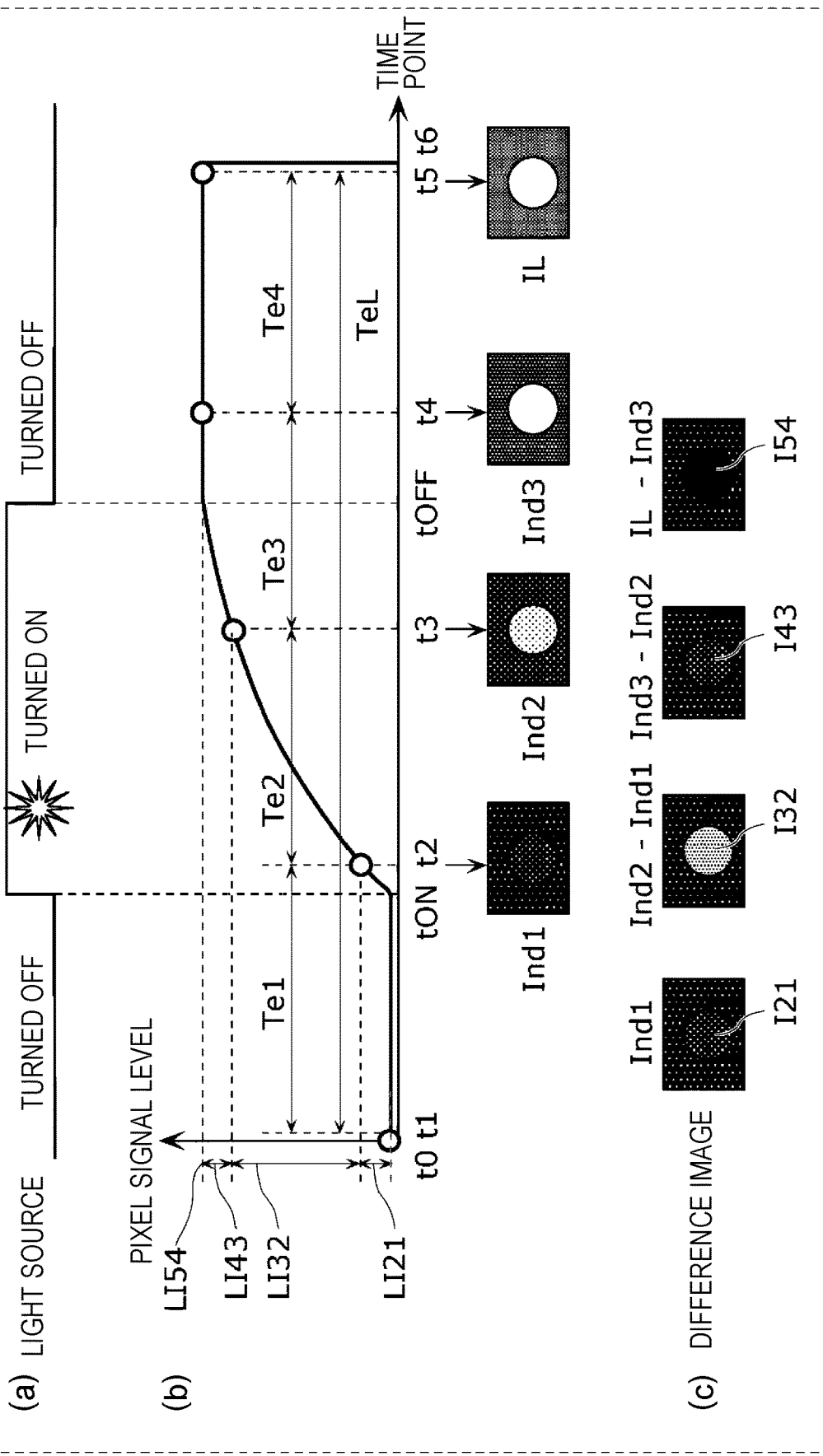
FIG. 13 is a diagram for describing another example of changes in the pixel signal level of the charge accumulation nodes according to the first embodiment.

FIG. 13 is a diagram for describing another example of changes in the pixel signal level of the charge accumulation nodes 41. FIG. 13 illustrates an example of a case in which the light source is turned on in one segment of the exposure time TeL in the normal readout image data IL as a scene to be imaged which is different from the scene to be imaged in FIG. 10. Part (a) in FIG. 13 is a graph illustrating a timing at which the light source is turned on. An upper side in part (b) in FIG. 13 is a graph illustrating the pixel signal level of the charge accumulation nodes 41 in the pixels 10 in an area located on the imaging plane and corresponding to the light source. A lower side in part (b) in FIG. 13 is a view illustrating an example of images corresponding to the nondestructive readout image data Ind1, Ind2, and Ind3 and the normal readout image data IL. Part (c) in FIG. 13 is a view illustrating an example of images corresponding to the nondestructive readout image data Ind1 and the difference image data Ind2−Ind1, Ind3−Ind2, and IL−Ind3.

Although the timings at which the normal readout operation and the nondestructive readout operation of the pixels 10 in FIG. 13 are the same as those in FIGS. 6, 7, and so on, the light source is turned on at time point tON and is turned off at time point tOFF, as illustrated in parts (a) and (b) in FIG. 13.

As illustrated in part (b) in FIG. 13, the pixel signal level begins to increase at time point tON and does not increase after time point tOFF. Images corresponding to the nondestructive readout image data Ind1, Ind2, and Ind3 obtained by the nondestructive readouts at the respective time points and the normal readout image data IL obtained by the normal readout in the exposure time TeL, the pieces of image data being based on the above-described pixel signal level, are, for example, the images illustrated at the lower side in part (b) in FIG. 13. In addition, the nondestructive readout image data Ind1 and the difference image data Ind2−Ind1, Ind3−Ind2, and IL−Ind3, which are obtained as described above, are, for example, images illustrated in part (c) in FIG. 13. According to the above-described operation of the image selecting unit 141, the difference image data Ind2−Ind1 in which the light source portion is most brightly shown is output as the output image data IS of the short-time exposure image output by the HDR combining unit 142 at the subsequent stage. In the pixel-signal-level graph in part (b) in FIG. 13, the difference image data Ind2−Ind1 is also image data acquired from a time slot in which the pixel signal level increases with the largest gradient with respect to the exposure time, and can be regarded as image data in which the light source is turned on, that is the farthest from the saturation state of the charge accumulation nodes 41 in the imaging unit 120, and that best captures information on the subject.

Operation of HDR Combining Unit

The HDR combining unit 142 combines the output image data IS of the short-time exposure image of the image selecting unit 141 and the normal readout image data IL of the long-time exposure image output from the imaging unit 120, to generate the combination-result image data IHDR of the high dynamic range image. A known method may be used for a generating means for the combination-result image data IHDR of the high dynamic range image. For example, for the pixel values in the combination-result image data IHDR, a weighted-addition result of corresponding pixel values in the output image data IS of the image selecting unit 141 and the normal readout image data IL may be used. That is, when the pixel value at position x in the combination-result image data IHDR is represented by IHDR(x), IHDR(x) can be calculated according to:

$$IHDR(x)=\alpha(x) \times IL(x)+(1-\alpha(x)) \times IS(x) \quad \text{Equation (1)},$$

where $\alpha(x)$ is a real number that satisfies $0 \leq \alpha(x) \leq 1$. Also, IL(x) is a pixel value at position x in the normal readout image data IL, and IS(x) is a pixel value at position x in the output image data IS. In order to compensate for differences between the pixel values IS(x) and IL(x), the differences being caused by the difference in the exposure time, the calculation in equation (1) may be performed after applying a gain to the pixel values of each piece of image data, as appropriate. Also, a coefficient $\alpha(x)$ in equation (1) is a value that varies for each pixel or for each block including a plurality of pixels and can be determined, for example, based on both the luminance values and noise levels in the output image data IS and the normal readout image data IL. For example, for a pixel whose luminance value in the normal readout image data IL is close to a maximum value, $\alpha(x)$ is reduced. Also, for example, in a pixel that is included in pixels in the output image data IS and in which dispersion from surrounding pixels is large and noise level is high, $\alpha(x)$ is increased.

As described above, the imaging device 100 according to the present embodiment performs one normal readout and at least one nondestructive readout in one frame period. As a result of the normal readout and at least one nondestructive readout, a plurality of pieces of image data on which the readout is nondestructively performed a plurality of times are output. In addition, by using a difference between at least one piece of nondestructive readout image data or a difference between the normal readout image data and the nondestructive readout image data, the imaging device 100 generates at least one piece of image data with an exposure time that is equivalent to image data acquired with a shorter exposure time than the exposure time in the normal readout. In addition, the output image data IS that is most appropriate as a short-time exposure image used for the high dynamic range combining is selected from the initial image data, which is image data nondestructively read out first and output, and at least one piece of difference image data, for example, based on local luminance values, and the high dynamic range processing is performed using the output image data IS selected as described above and the normal readout image data IL, to thereby generate the combination-result image data IHDR of a high dynamic range image. The imaging device 100 according to the present embodiment continuously observes the state of a subject by performing readout nondestructively in one frame period. Thus, for example, even when the state of the subject changes over time, like a blinking light source, image data of an appropriate short-time exposure image which is the most appropriate for the high dynamic range imaging can be generated following the changes. In the imaging device 100, for example, a situation in which the state of a subject cannot be appropriately captured in both a long-time exposure image and a short-time exposure image, like a situation described with reference to FIG. 2, does not occur, and the imaging device 100 can effectively perform the high dynamic range imaging on any subject. That is, the imaging device 100 can effectively increase the dynamic range of an image to be acquired.

Second Embodiment

Next, a description will be given of a second embodiment. The second embodiment differs from the above-described first embodiment in that an image selecting unit 141B is provided instead of the image selecting unit 141 provided in the imaging device 100.

Figure 14:
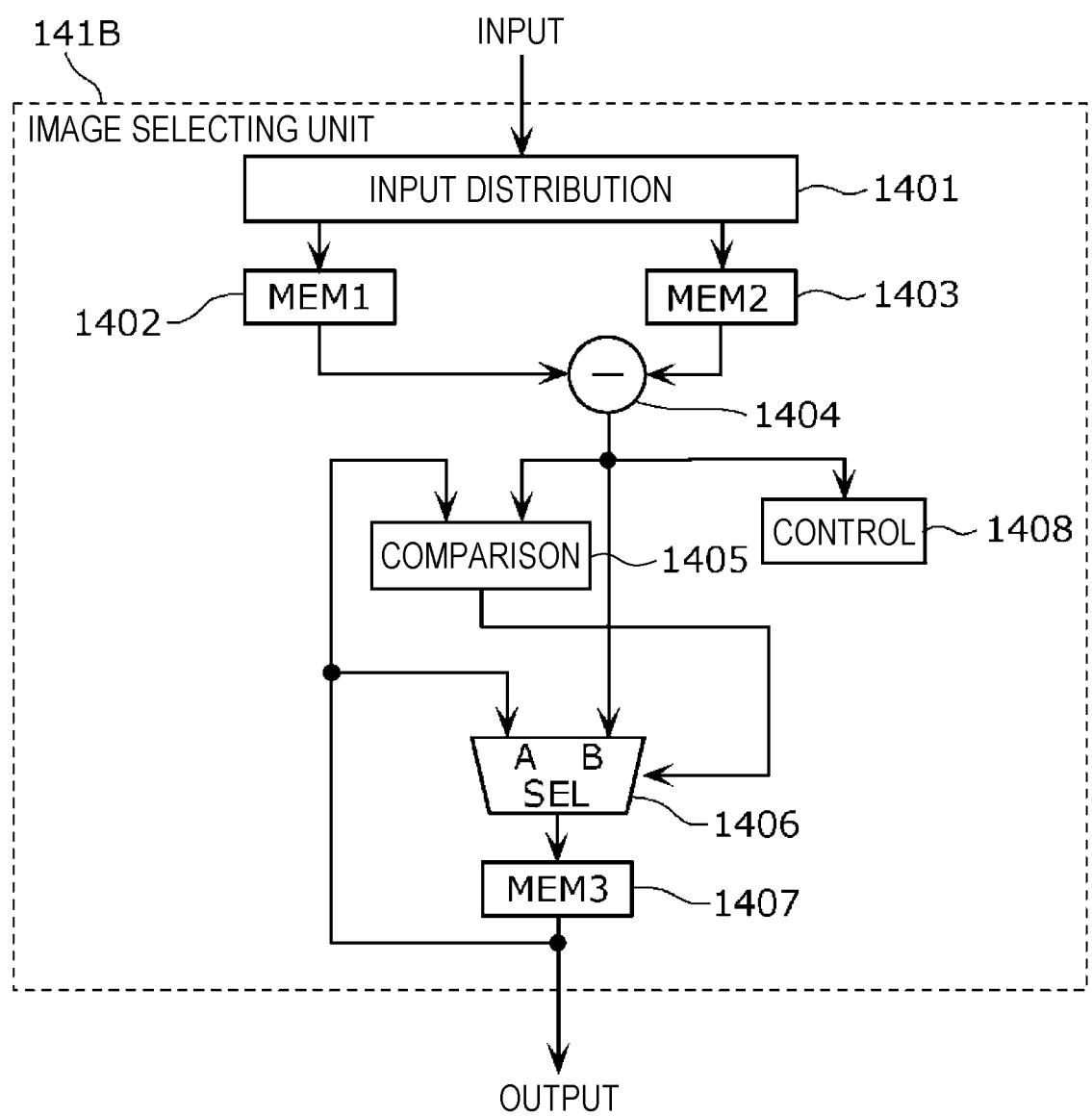
FIG. 14 is a block diagram illustrating an exemplary configuration of an image selecting unit according to a second embodiment.

FIG. 14 is a block diagram illustrating an exemplary configuration of the image selecting unit 141B according to the present embodiment. Compared with the image selecting unit 141 according to the first embodiment, the image selecting unit 141B differs in that it has a selection control unit 1408. Other constituent elements that are substantially the same as those in the image selecting unit 141 according to the first embodiment are denoted by reference numerals that are the same as those in FIG. 8, and detailed descriptions are not given hereinafter. Also, the operation of the image selecting unit 141B is mostly the same as the operation of the image selecting unit 141 according to the first embodiment illustrated in FIGS. 9A and 9B, and only differences therebetween will be described below.

The selection control unit 1408 controls on-and-off of the operation of the entire image selecting unit 141B, based on the outputs of the subtracting unit 1404 in each operation step in the image selecting unit 141B, that is, the luminance values in the difference image data between pieces of nondestructive readout image data. Although not illustrated in FIG. 14, the on-and-off of the operation of the entire image selecting unit 141B are realized, for example, by putting an output end of the imaging unit 120 and an input end of the input distributing unit 1401 into a connected state or an unconnected state. When the output end and the input end are put into the unconnected state, the output of the image selecting unit 141B is fixed to the image data stored in the frame memory MEM3 at this point in time, and the image selection operation in the image selecting unit 141B stops. Also, not only the image selection operation in the image selecting unit 141B but also the nondestructive readout itself may be stopped in the imaging unit 120 and the imaging control unit 130. However, the readout stopped at this point in time is any of the nondestructive readouts performed from time points t2 to t4 in FIGS. 9A and 9B, and the normal readout at time point t5 is performed.

Figure 15:
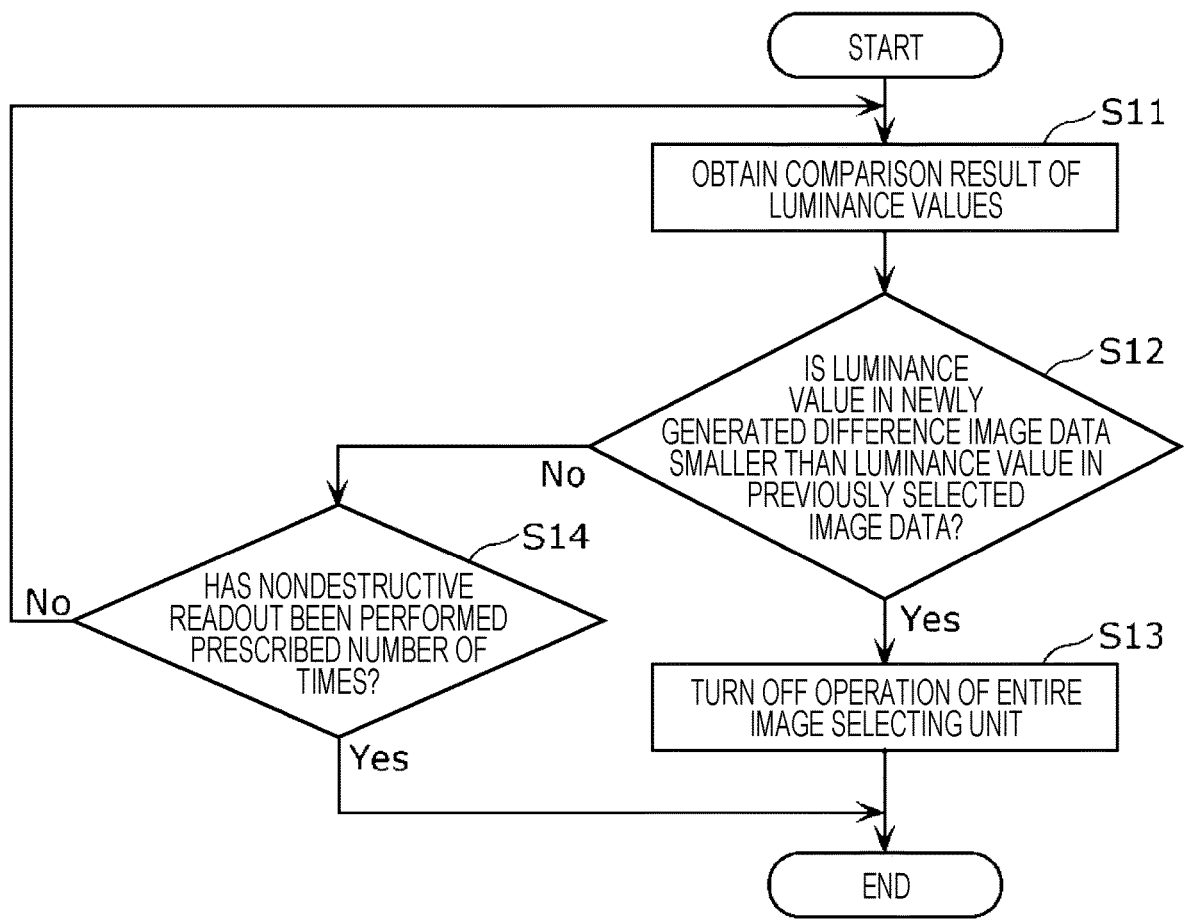
FIG. 15 is a flowchart illustrating one example of the operation a selection control unit according to the second embodiment.

FIG. 15 is a flowchart illustrating one example of the operation of the selection control unit 1408. First, when the nondestructive readout in the imaging unit 120 in one frame period is started, the selection control unit 1408 obtains a comparison result of luminance values in the comparing unit 1405 (step S11). In other words, in each operation step illustrated in FIGS. 9A and 9B, the selection control unit 1408 monitors, for example, local luminance values in initial image data and difference image data supplied from the subtracting unit 1404 to the comparing unit 1405.

Next, the selection control unit 1408 determines whether or not a luminance value in difference image data newly generated by the subtracting unit 1404 is smaller than a luminance value in the image data previously selected for the comparing unit 1405, that is, than temporary output image data at this point in time (step S12). When the luminance value in the newly generated difference image data is smaller than the luminance value in the previously selected image data (Yes in step S12), the selection control unit 1408 stops the operation of the entire image selecting unit 141B (step S13). When a luminance value in the difference image data generated in each operation step illustrated in FIG. 9B falls below a luminance value in the initial image data or the difference image data in the immediately previous step, the image selection operation in the image selecting unit 141B is stopped, by the above-described method, at a point in time when the corresponding operation step is completed, and the image selecting unit 141B does not perform a subsequent image selection operation until a next frame period is started. As a result, the image selecting unit 141B selects the previously selected image data as the output image data IS and outputs it to the HDR combining unit 142.

Thereafter, for example, the selection control unit 1408 turns on the operation of the entire image selecting unit 141B in synchronization with the start of the next frame period.

When the luminance value in the newly generated difference image data is larger than or equal to the luminance value in the previously selected image data (No in step S12), the selection control unit 1408 determines whether or not the nondestructive readout in the imaging unit 120 has been performed a prescribed number of times in one frame period (step S14). When the nondestructive readout in the imaging unit 120 has been performed a prescribed number of times in one frame period (Yes in step S14), the selection control unit 1408 finishes the operation. When the nondestructive readout in the imaging unit 120 has not been performed a prescribed number of times in one frame period (No in step S14), the operation from step S11 is repeated.

In general, the pixel signal level obtained in the imaging unit 120 does not increase infinitely with elapse of the exposure time and is saturated at a certain pixel signal level, as illustrated in FIG. 10. Such a saturation state of the pixel signal level is more likely to occur with nondestructive readout at a later time point, when the imaging unit 120 is assumed to capture light with a certain amount of light from a subject. Also, as described with reference to FIG. 10, when the pixel signal level gets close to or reaches the saturation, and the gradient of an increase in the pixel signal level relative to the exposure time is small or is substantially 0, the luminance value in the difference image data decreases. Thus, when the luminance value in the difference image data read out at a later time point is smaller, the possibility that a decrease in the luminance value in the difference image data is occurring due to the saturation of the pixel signal level is thought to be high. Hence, when the luminance value in the difference image data obtained at a later time point is smaller than the luminance value in the difference image data previous thereto, the pixel signal level in an area included in the imaging unit 120 and corresponding to the light source portion is close to the saturation state, and the image selecting unit 141B according to the present embodiment regards that it is difficult to obtain, in image selection using the difference image data generated subsequently, image data of a short-time exposure image that is suitable for the high dynamic range processing, and stops subsequent image selection operation. Thus, a reduction in the number of executions of the image selection operation or the nondestructive readout provides advantages of speeding up the processing and reducing the power consumption.

A criteria for the luminance value determination in the selection control unit 1408 in step S12 is not limited to the example described above. The selection control unit 1408 may make a determination using a criteria that is similar to that in the luminance value comparison in the comparing unit 1405 described above in FIG. 12, such as a determination as to whether or not the luminance value in the difference image data newly generated by the subtracting unit 1404 is smaller than the luminance value in the image data, previously selected by the comparing unit 1405, by a predetermined threshold or more. For example, when the comparing unit 1405 selects the temporary output image data that is previously selected image data, the selection control unit 1408 may turn off the operation of the entire image selecting unit 141B.

Third Embodiment

Next, a description will be given of a third embodiment. The third embodiment differs from the first embodiment in that an imaging unit 120B is provided instead of the imaging unit 120 provided in the imaging device 100. The photoelectric converters 13 are not limited to those having the photoelectric conversion layers 15 as illustrated in FIGS. 4 and 5. For example, photodiodes (PD) may be used as the photoelectric converters.

Figure 16:
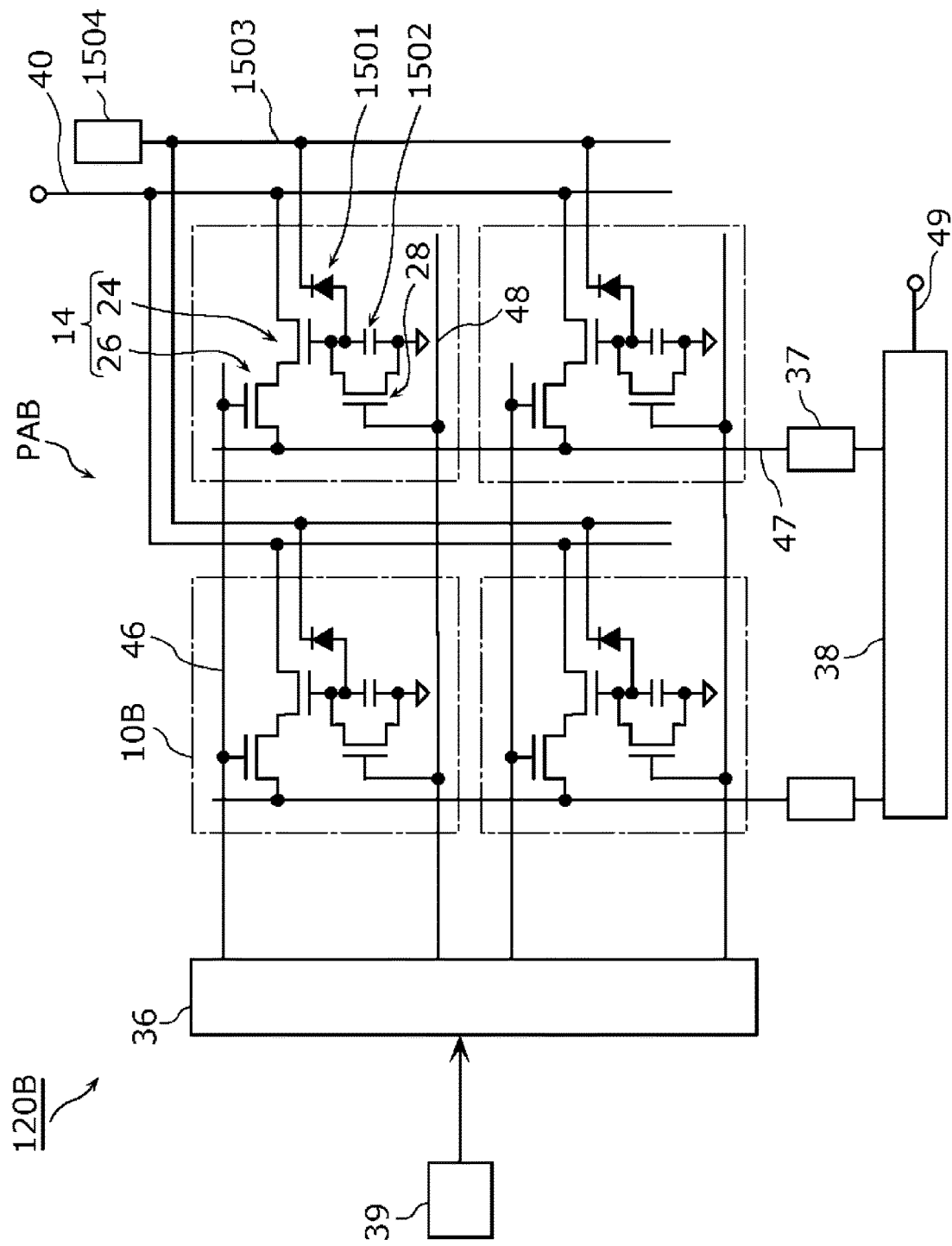
FIG. 16 is a schematic diagram illustrating an exemplary circuit configuration of an imaging unit according to a third embodiment.

FIG. 16 is a schematic diagram illustrating an exemplary circuit configuration of the imaging unit 120B according to the present embodiment. Constituent elements that are substantially the same as those in the imaging unit 120 in the first embodiment illustrated in FIG. 4 are denoted by references numerals that are the same as in FIG. 4, and descriptions thereof are not given hereinafter.

As illustrated in FIG. 16, the imaging unit 120B has a pixel array PAB including a plurality of pixels 10B arranged two-dimensionally. Each pixel 10B has a photodiode 1501 instead of the photoelectric converter 13 in the pixel 10. Also, the pixel 10B has a capacitor 1502 that is connected to an anode of the photodiode 1501 and in which electrical energy obtained by the photodiode 1501 is accumulated as charge. The charge accumulated in the capacitor 1502 is detected at the capacitor 1502 as a voltage, which is amplified by a source follower circuit constituted by the signal detection transistor 24 and is output to the vertical signal line 47. The source follower circuit constituted by the signal detection transistor 24 has a high input impedance and thus has a characteristic of not consuming the charge accumulated in the capacitor 1502. Therefore, it is possible to retrieve the voltage a plurality of times without destructing the charge accumulated in the capacitor 1502, and thus the imaging unit 120B can also perform nondestructive readout.

The pixel 10B in the imaging unit 120B according to the present embodiment has the reset transistor 28, as in the imaging unit 120 according to the first embodiment. In the reset transistor 28, a source terminal and a drain terminal of the reset transistor 28 are connected to respective two opposite ends of the capacitor 1502. Controlling the potential of the reset control line 48 makes it possible to reset and remove the charge accumulated in the capacitor 1502. With this arrangement, the imaging unit 120B realizes a reset operation of the pixel 10B which is involved in the normal readout. Also, in this example, a PD voltage line 1503 is connected to a cathode of the photodiode 1501, and the PD voltage line 1503 is further connected to a PD voltage supply circuit 1504. The PD voltage supply circuit 1504 supplies, for example, the same voltage as the power-supply voltage VDD to the cathode of the photodiode 1501.

The operation of the imaging unit 120B according to the present embodiment can be performed in the completely same manner as the operation pattern of the imaging unit 120 according to the first embodiment illustrated in FIG. 7. That is, the potential of the address control line 46 is set to a high level, so that the potential of the charge accumulation node 41 is output to the vertical signal line 47 via the address transistor 26 whose gate is connected to the address control line 46 and is transmitted to the column signal processing circuit 37. Also, the potential of the reset control line 48 is set to a high level, so that the charge accumulated in the capacitor 1502 is reset via the reset transistor 28 whose gate is connected to the reset control line 48, and the capacitor 1502 can be returned to the initial state in which charge can be accumulated. During the nondestructive readout, it can be realized by setting only the potential of the address control line 46 to the high level and leaving the potential of the reset control line 48 at the low level.

According to the present embodiment, when the imaging unit 120B includes the photodiodes 1501, the high dynamic range imaging can be performed with a method similar to that in the first embodiment.

Other Embodiments

Although the imaging devices according to one or more aspects have been described above on the basis of the embodiments, the present disclosure is not limited to these embodiments.

Although, in the embodiments described above, the normal readout image data IL, which is one example of the second image data, has been used as the image data of a long-time exposure image used for the combination in the HDR combining unit 142, the present disclosure is not limited thereto. Image data that is included in a plurality of pieces of image data output nondestructively by the imaging unit 120 or 120B in one frame period and that is other than the nondestructive readout image data Ind1 (i.e., the initial image data) may be used as the second image data of a long-time exposure image. For example, the image processing unit 140 may select, of the nondestructive readout image data Ind2 and Ind3 and the normal readout image data IL, image data in which the smallest value of the luminance values in the pixels therein is in a predetermined range and may use the selected image data for the combination. The predetermined range is set, for example, depending on the purpose of using an image to be acquired. Also, for example, from the point of view of overlap of the exposure times, the image processing unit 140 may select, of the nondestructive readout image data Ind2 and Ind3 and the normal readout image data IL, the second image data of a long-time exposure image from the nondestructive readout image data or normal readout image data whose exposure time includes the period of substantial exposure of the output image data IS that is eventually selected.

Also, although, in the embodiments described above, the output image data IS is selected from the nondestructive readout image data Ind1, which is the initial image data, and the difference image data Ind2−Ind1, Ind3−Ind2, and IL−Ind3, the present disclosure is not limited thereto. For example, when the exposure time of the nondestructive readout image data Ind1 is considerably shorter than the substantial exposure time of the difference image data Ind2−Ind1, Ind3−Ind2, and IL−Ind3, or the amount of reset noise in the reset operation is large, candidates of image data selected as the output image data IS do not include the nondestructive readout image data Ind1, and the nondestructive readout image data Ind1 does not have to be input to the image processing unit 140. That is, the output image data IS may be selected from the difference image data Ind2−Ind1, Ind3−Ind2, and IL−Ind3.

In addition, modes obtained by making various modifications conceived by those skilled in the art to the embodiments and modes constructed by combining the constituent elements in different embodiments are also encompassed by the scope of the present disclosure, as long as such modes do not depart from the spirit of the present disclosure.

The imaging device according to the present disclosure can be applied to various sensor systems and camera systems, such as digital still cameras, medical cameras, surveillance cameras, on-board/in-vehicle cameras, digital single-lens reflex cameras, or digital mirrorless single-lens reflex cameras.

What is claimed is:

1. An imaging device comprising:
an imaging unit that includes a plurality of pixels, respectively including photoelectric converters that generate signal charge and charge accumulators that accumulate the signal charge wherein the imaging unit outputs image data based on signals corresponding to the signal charge accumulated in the charge accumulators; and
a processing circuit that processes the image data output by the imaging unit,
wherein the imaging unit sequentially outputs a plurality of pieces of image data in one frame period by performing readout nondestructively a plurality of times; and
the processing circuit
generates at least one piece of difference image data by determining a difference between two pieces of continuously output image data of the plurality of pieces of image data,
selects, as first image data, one piece of image data from initial image data included in the plurality of pieces of image data and output first and the at least one piece of difference image data, based on respective luminance values, and
combines the first image data and second image data to generate third image data, the second data being included in the plurality of pieces of image data and being other than the initial image data.

2. The imaging device according to claim 1,
wherein the second image data is image data included in the plurality of pieces of image data and output last.

3. The imaging device according to claim 1,
wherein the processing circuit
selects one piece of image data from the initial image data and first difference image data, based on respective luminance values, the first difference image data being generated first in the frame period among the at least one piece of difference image data, and
selects the first image data by repeating selecting one piece of image data from previously selected one piece of image data and newly generated difference image data, based on respective luminance values.

4. The imaging device according to claim 3,
wherein when a luminance value in the newly generated difference image data is smaller than a luminance value in the previously selected one piece of image data, the processing circuit selects the previously selected one piece of image data.

5. The imaging device according to claim 1,
wherein the processing circuit includes:
a first memory that stores one of two pieces of continuously output image data of the plurality of pieces of image data output by the imaging unit and a second memory that stores the other piece of image data;
a difference arithmetic circuit that generates difference image data by determining a difference between the two pieces of image data stored in the first memory and the second memory;
a third memory that stores the initial image data or the difference image data generated by the difference arithmetic circuit; and
a comparison circuit that compares a luminance value in the difference image data generated by the difference arithmetic circuit with a luminance value in the initial image data or the difference image data stored in the third memory.

6. The imaging device according to claim 1,
wherein each of the photoelectric converters includes a first electrode, a second electrode, and a photoelectric conversion layer between the first electrode and the second electrode.

7. The imaging device according to claim 1,
wherein each of the photoelectric converters includes a photodiode.

8. The imaging device according to claim 1,
wherein the imaging unit includes a signal readout circuit.

9. An image processing method comprising:
sequentially inputting a plurality of pieces of image data obtained by performing readout nondestructively a plurality of times in one frame period;
determining a difference between two pieces of continuously input image data of the plurality of pieces of image data to generate at least one piece of difference image data;
selecting one piece of image data, as first image data, from initial image data included in the plurality of pieces of image data and input first and the at least one piece of difference image data, based on respective luminance values; and
combining the first image data and second image data to generate third image data, the second image data being included in the plurality of pieces of image data and being other than the initial image data.

10. The image processing method according to claim 9,
wherein the second image data is image data included in the plurality of pieces of image data and output last in the frame period.

11. The image processing method according to claim 9,
wherein one piece of image data is selected from the initial image data and first difference image data, based on respective luminance values, the first difference image data being generated first in the frame period among the at least one piece of difference image data; and
selecting one piece of image data from previously selected one piece of image data and newly generated difference image data, based on respective luminance values, is repeated to select the first image data.

12. The image processing method according to claim 11, wherein, when a luminance value in the newly generated difference image data is smaller than a luminance value in the previously selected one piece of image data, the previously selected one piece of image data is selected.

* * * * *